(12) United States Patent
Karpinsky et al.

(10) Patent No.: US 9,463,935 B1
(45) Date of Patent: Oct. 11, 2016

(54) VIBRATORY PRODUCT CONVEYOR SYSTEM

(71) Applicant: Food Process Systems Inc., Lodi, WI (US)

(72) Inventors: James L. Karpinsky, Poynette, WI (US); Scott J. Rose, Columbus, WI (US); James M. Bakos, Poynette, WI (US); Adam A. Smith, Baraboo, WI (US)

(73) Assignee: Vibratory Solutions, LLC, Lodi, WI (US)

( * ) Notice: Subject to any disclaimer, the term of this patent is extended or adjusted under 35 U.S.C. 154(b) by 0 days.

(21) Appl. No.: 14/665,830

(22) Filed: Mar. 23, 2015

Related U.S. Application Data

(60) Provisional application No. 61/942,189, filed on Mar. 24, 2014.

(51) Int. Cl.
| | |
|---|---|
| *B65G 27/06* | (2006.01) |
| *B65G 47/26* | (2006.01) |
| *B65G 47/24* | (2006.01) |
| *B65G 47/88* | (2006.01) |

(52) U.S. Cl.
CPC .............. *B65G 47/24* (2013.01); *B65G 47/88* (2013.01)

(58) Field of Classification Search
CPC  B65G 27/00; B65G 47/1492; B65G 47/687; B65G 47/24; B65G 47/256
USPC ................. 198/390, 391, 758, 446, 453, 416
See application file for complete search history.

(56) References Cited

U.S. PATENT DOCUMENTS

| | | | |
|---|---|---|---|
| 2,186,652 A * | 1/1940 | Orth ................... | B65G 47/1492 198/396 |
| 2,775,268 A | 12/1956 | Eckart | |
| 2,910,165 A * | 10/1959 | Byington ........... | B65G 47/1485 193/44 |
| 3,166,175 A | 1/1965 | Kurtz et al. | |
| 3,245,518 A | 4/1966 | Reibel et al. | |
| 3,263,592 A | 8/1966 | Hickey et al. | |
| 3,469,672 A * | 9/1969 | Stutske .............. | B65G 47/1492 198/446 |
| 3,547,075 A | 12/1970 | Johnson | |
| 3,640,767 A | 2/1972 | Fulton et al. | |
| 3,648,596 A | 3/1972 | Zito | |
| 3,762,363 A | 10/1973 | Johnson | |

(Continued)

FOREIGN PATENT DOCUMENTS

| | | |
|---|---|---|
| CA | 2697897 A1 | 2/2011 |
| GB | 2209006 | 4/1989 |
| JP | 410263521 | 10/1998 |

*Primary Examiner* — James R Bidwell
(74) *Attorney, Agent, or Firm* — Craig A. Fieschko, Esq.; DeWitt Ross & Stevens S.C.

(57) ABSTRACT

A vibratory conveyor system particularly suitable for elongated foodstuffs and other products includes a rogue product removal pan which can only pass a single one of the items being processed, with the item having the desired alignment/orientation, through each of its product acceptance lanes at a given time. Items therefore leave the rogue product removal pan in orderly rows of single items, thereby easing their packaging. Misaligned items, and or items that were stacked atop other items, are culled by the rogue product removal pan, and can be "recycled" back to the entry of the rogue product removal pan. These "recycled" items are passed through the rogue product removal pan for packaging if they assume the desired orientation, or are again culled and "recycled" if they do not assume the desired orientation.

24 Claims, 21 Drawing Sheets

(56) References Cited

U.S. PATENT DOCUMENTS

| | | | |
|---|---|---|---|
| 3,809,132 A | 5/1974 | Jones | |
| 3,869,972 A | 3/1975 | Chase | |
| 3,948,493 A | 4/1976 | Moser et al. | |
| 4,058,083 A | 11/1977 | Miller | |
| 4,062,413 A * | 12/1977 | Parker | G01G 13/08 177/122 |
| 4,214,548 A | 7/1980 | Booth et al. | |
| 4,777,056 A | 10/1988 | Buhler et al. | |
| 4,898,270 A * | 2/1990 | Hopkins | B65G 47/1471 198/390 |
| 4,995,157 A * | 2/1991 | Hall | H05K 13/022 198/385 |
| 5,067,431 A | 11/1991 | Heitiller | |
| 5,238,303 A | 8/1993 | Dixon | |
| 5,314,056 A * | 5/1994 | Davis | B65G 47/1492 198/396 |
| 5,437,723 A | 8/1995 | Sollich | |
| 5,512,008 A | 4/1996 | Musschoot | |
| 5,937,744 A | 8/1999 | Nothum, Sr. et al. | |
| 6,343,688 B1 | 2/2002 | McKinley | |
| 6,505,547 B1 | 1/2003 | Burnett et al. | |
| 6,510,809 B2 | 1/2003 | Kuenen | |
| 7,174,846 B2 | 2/2007 | Zeegers et al. | |
| 7,703,411 B1 | 4/2010 | Bakos et al. | |
| 7,757,836 B2 | 7/2010 | Karpinsky et al. | |
| 8,181,592 B2 | 5/2012 | Karpinsky et al. | |
| 8,359,995 B2 | 1/2013 | Bakos et al. | |
| 2002/0175051 A1 | 11/2002 | Samson | |
| 2008/0283366 A1 | 11/2008 | Karpinsky et al. | |
| 2009/0007842 A1 | 1/2009 | Stacy et al. | |
| 2011/0097459 A1 | 4/2011 | Bakos et al. | |
| 2012/0244264 A1 | 9/2012 | Karpinsky et al. | |

\* cited by examiner

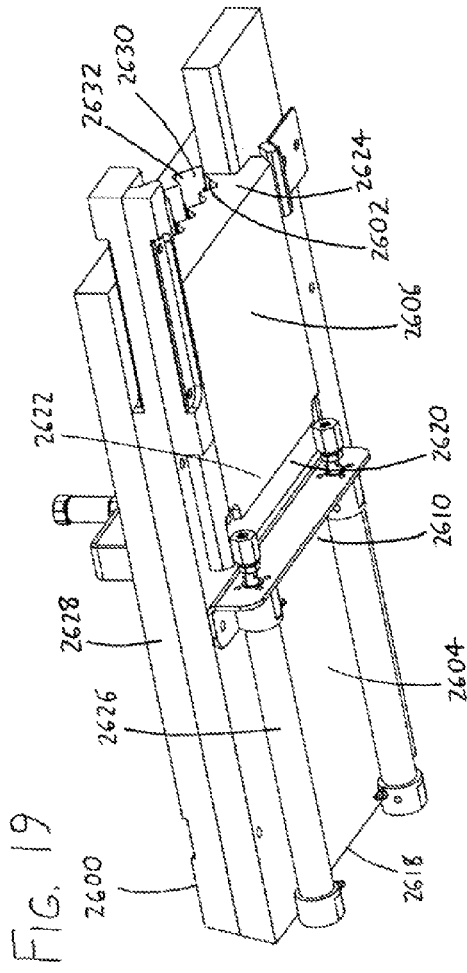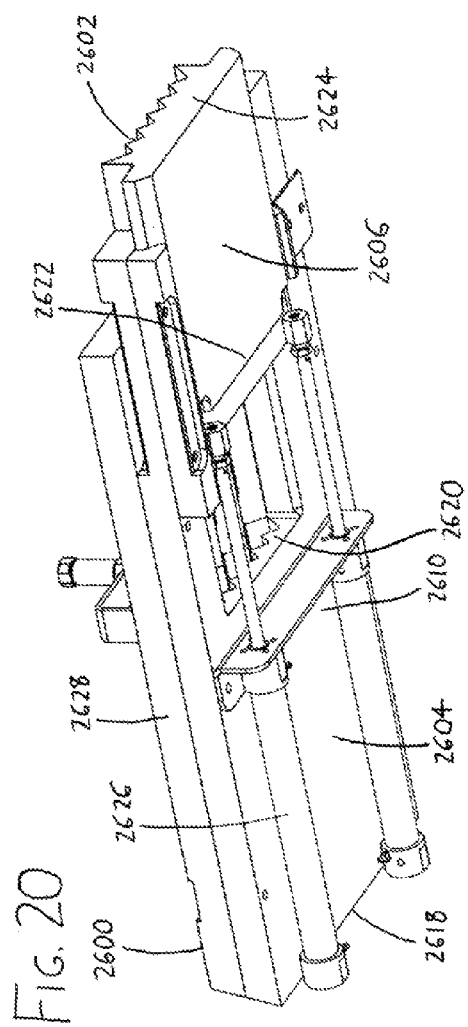

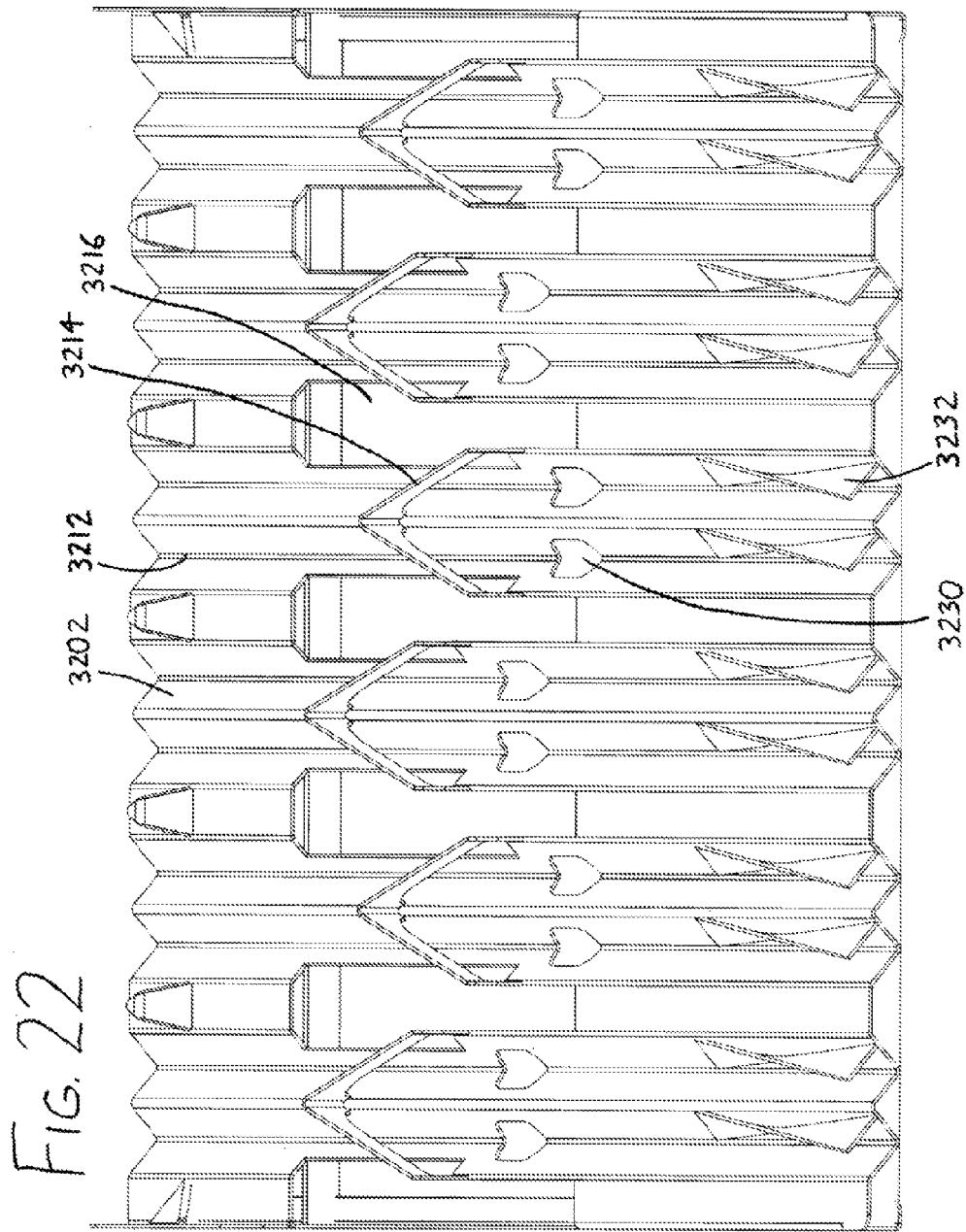

VIBRATORY PRODUCT CONVEYOR SYSTEM

CROSS-REFERENCE TO RELATED APPLICATIONS

This application claims priority under 35 USC §119(e) to U.S. Provisional Patent Application 61/942,189 filed Mar. 24, 2013, the entirety of which is incorporated by reference herein.

FIELD OF THE INVENTION

This document concerns an invention relating generally to product conveyor systems, and more specifically to vibratory conveyor systems which transport and organize product for packaging or other processing.

BACKGROUND OF THE INVENTION

Automated and semi-automated product manufacturing systems often utilize conveyors to transport completed (or semi-completed) product for packaging, or for further processing and completion. Depending on the types of products being manufactured, different types of conveyor systems may be more appropriate than others. Belted conveyor systems—that is, conveyor systems using endless belts driven by rollers—are perhaps the most common type of conveyor systems, but they often require significant maintenance. Additionally, because belt wear can cause shedding of bits of wire or other belt material, which can then be picked up by the product, belted conveyor systems can be disadvantageous for use with food and other products which are sensitive to contamination. Vibratory conveyor systems, which transport product across a vibrating pan (one or more platforms or other surfaces across which product is vibratorily conveyed), can be more appropriate for use with such products. Such vibratory conveyor systems typically utilize a relatively lightweight product transport pan, often mounted in a surrounding frame, with the pan or frame being resiliently mounted to a relatively heavy shaker base, (for example, by leaf or beam springs). The shaker base is oscillated at relatively high frequency (e.g., at 5-100 Hz), and at low amplitude. As the vibration is transmitted to the product transport pan, product essentially "bounces" across the pan in accordance with any inclination of the pan, and/or in accordance with the direction of oscillation imparted to the pan. Examples of vibratory conveyor systems of this nature can be found in U.S. Pat. No. 7,757,836 to Karpinsky et al.; U.S. Pat. No. 7,703,411 to Bakos et al.; U.S. Pat. No. 8,181,592 to Karpinsky et al.; U.S. Pat. No. 8,359,995 to Bakos et al.; U.S. Patent Appl'n. Publ'n. 2011/0097459 to Bakos et al.; and U.S. Patent Appl'n. Publ'n. 2012/0244264 to Karpinsky et al., as well as the patents cited in (and patents citing to) these references, all of which are incorporated by reference herein such that their contents should be regarded as a part of this document.

As in belted conveyor systems, vibratory conveyor systems can involve challenges with obtaining proper positioning of product traveling on the systems, particularly where a conveyor system is intended to provide product to a packaging system: it is often desirable to situate product so that all products have the same orientation, and/or so that they are aligned in an ordered array, for ease of packaging or other further processing. For example, a fill-and-seal packaging system may provide packaging trays or "webs" having multiple compartments or other areas into which product is to be deposited in a particular orientation so that the packaging can thereafter be properly sealed with the product inside. Guides, pushers, or other structures can be situated along a conveyor system to help move product into a desired position, but such product positioning systems tend to be imperfect, and require at least some degree of "dressing" along or at the end of the conveyor system (i.e., some degree of manual repositioning of "rogue" products which do not have the desired location, orientation, and/or alignment). There is an ongoing need for conveyor systems which achieve desired product positioning with minimal need for dressing, while at the same time minimizing the machinery needed for product repositioning (and its cost and maintenance burdens), and while also minimizing product handling and wear. These concerns can be particularly critical where the product being transported is a food product, as such products tend to be fragile and require sanitary processing.

SUMMARY OF THE INVENTION

The invention involves a vibratory conveyor system which is intended to at least partially address the aforementioned problems. To give the reader a basic understanding of some of the advantageous features of the invention, following is a brief summary of exemplary versions of the vibratory conveyor system, with reference being made to the accompanying drawings (which are briefly reviewed in the following "Brief Description of the Drawings section of this document) to assist the reader's understanding. Since the following discussion is merely a summary, it should be understood that more details regarding the exemplary versions may be found in the Detailed Description set forth elsewhere in this document. The claims set forth at the end of this document then define the various versions of the invention in which exclusive rights are secured.

The accompanying drawings illustrate two exemplary versions of the vibratory conveyor system, with the first being shown overall at 1000 in FIG. 1 with its various subassemblies being shown in FIGS. 2-7, and the second being shown at 2000 in FIGS. 8-9 with its various subassemblies being shown in FIGS. 10-20. Each of the vibratory conveyor systems 1000 and 2000 is configured to align products into a desired orientation for packaging or other purposes, and to preferably group the products into an orderly arrangement (e.g., into rows of similarly-aligned product). More particularly, the exemplary systems 1000 and 2000 depicted in the drawings are particularly useful for conveyance and orderly grouping of elongated foodstuffs known in the trade as "stick" (longer and skinny) and "dog" (shorter and fatter) products, such as sausages, corn dogs, taquitos/flautas, burritos, eggrolls, meat sticks, jerky strips, and the like. However, they may be used (or may be adapted to be used) with other types of product. The vibratory conveyor system 1000 of FIG. 1 includes a product distribution frame 1100 (see also FIG. 2) including a distribution pan 1102 and a rogue product removal pan 1202, with an (orbital) recycling conveyor 1300 shown in FIG. 1 encircling the product distribution frame 1100; a path adjustment frame 1400 (see also FIG. 5) including a path adjustment pan 1402; and a product loader 1600 (see also FIG. 7). The vibratory conveyor system 2000 of FIGS. 8-9 includes a product distribution frame 2100 (see also FIG. 10) with a distribution pan 2102; a rogue product removal frame 2200 (see also FIG. 11) with a rogue product removal pan 2202; a (linear) recycling conveyor 2300 shown in FIGS. 8-9 between the rogue product removal frame 2200 and product distribution frame 2100; a path adjustment frame 2400 (see also FIG. 14) including a path adjustment pan 2402; a product accumulator frame 2500 (see also FIG. 16) including a product accumulation pan 2502; and a product loader 2600 (see also FIG. 17). The product distribution frames 1100/2100. whose distribution pans 1102/2102 have distribution pan lengths extending between a distribution pan upstream end 1104/2104 and an opposing distribution pan downstream end 1106/2106, and distribution pan widths oriented perpendicular to their distribution pan lengths, are primarily intended to spread product received at their distribution pan upstream ends 1104/2104 (as from a conveyor) across their distribution pan widths so that product is at least somewhat evenly distributed across their distribution pan widths by the time the product reaches the distribution pan downstream ends 1106/2106. The rogue product removal pan 1202/2202—which is provided on the product distribution frame 1100 in the vibratory conveyor system 1000 of FIG. 1, and provided on its own rogue product removal frame 2200 in the vibratory conveyor system 2000 of FIGS. 8-9—is primarily intended to receive product from the distribution pan 1102/2102, and pass product which has the desired product orientation/alignment while culling misaligned product. The misaligned product removed from the product stream is then conveyed by the recycling conveyor 1300/2300 back upstream, preferably to the distribution pans 1102/2102, where it will (if now having the proper alignment) pass through the rogue product removal pan 1202/2202 to be received by the path adjustment pan 1402/2402 of the path adjustment frame 1400/2400. The path adjustment pan 1402/2402 adjusts the travel path(s) of product to at least begin to situate it in desired lanes of travel for subsequent packaging or other processing. The product may then be provided to a product loader 1600/2600, either directly as in the vibratory conveyor system 1000 of FIG. 1, or indirectly via a subassembly such as the product accumulator frame 172 of the vibratory conveyor system 2000 of FIGS. 8-9.

To review the various subassemblies of the conveyor systems 1000 and 2000 in greater detail, the illustrated distribution pans 1102/2102 have different features, though some or all of these features can be combined if desired. Looking particularly to FIG. 2 for the distribution pan 1102 of the conveyor system 1000 of FIG. 1, the distribution pan 1102 has two or more distribution pan tiers (here three tiers 1108A, 1108B, and 1108C) arrayed in succession along the distribution pan length, with each distribution pan tier 1108A/1108B/1108C including a series of valleys 1110A/1110B/1110C adjacently arrayed across the distribution pan width, with each pair of adjacent valleys having a peak 1110A/1110B/1110C therebetween. Each successive distribution pan tier includes more valleys than its preceding distribution pan tier, with upper tier 1108A having two valleys 1110A, middle tier 1108B having four valleys 1110B, and lower tier 1108C having eight valleys 1110C. Preferably, every other peak 1112A/1112B/1112C is aligned with a lowermost portion of a respective one of the valleys 1110A/1110B/1110C in the preceding distribution pan tier 1108A/1108B/1108C, with the valleys 1110A of tier 1108A being aligned with every other peak 1112B in tier 1108B, and the valleys 1110B of tier 1108B being aligned with every other peak 1112C in tier 1108C. As a result, product deposited on the middle of the first tier 1108A is divided into the two valleys 1110A by the peak 1112A, and then in turn into the four valleys 1110B by the peaks 1112B, and then in turn into the eight valleys 1110C by the peaks 1112C, tending to distribute product across the distribution pan width. At the same time, because the lengths of the valleys 1110A/1110B/1110C are parallel to the distribution pan length, product having an elongated shape tends to have its lengths settle into the valleys 1110A/1110B/1110C, and thereby have its lengths align with the distribution pan length (and the direction of product travel as well). Product may then spill from the final tier 1108C of the distribution pan 1102 to the rogue product removal pan 1202, which also located on the product distribution frame 1100.

FIG. 10 then shows the distribution pan 2102 of the conveyor system 2000 of FIGS. 8-9 in greater detail. This distribution pan 2102 is preferred for conveyor systems having higher product throughput, and it distributes product across the distribution pan width, and also into three vertically spaced/stacked product streams. A horizontal spreading portion 2108 of the distribution pan 2102 has raised vanes 2112 situated across the distribution pan width, with each vane 2112 having a length extending along the distribution pan length, wherein the spacing between the vanes 2112 increases as the vanes 2112 approach the distribution pan downstream end 2106 (i.e., the vanes 2112 diverge as they approach the distribution pan downstream end 2106). As a result, product deposited on the distribution pan 2102 near its distribution pan upstream end 2104 is horizontally spread across the distribution pan width as it is vibrated across the horizontal spreading portion 2108. The spread product then travels onto a vertical spreading portion 2114 of the distribution pan 2102, with the vertical spreading portion 2114 including two rows of distribution apertures 2116A and 2116B situated between the vanes 2112 and the distribution pan downstream end 2106. The rows are spaced along the distribution pan length, with the apertures in each row being spaced along the distribution pan width and the apertures being staggered between rows, whereby product traveling from the horizontal spreading portion 2108 of the distribution pan 2102 is preferably distributed in roughly equal amounts: (1) into the distribution apertures 2116A of the first row, and thus to a lowermost slide 2118A; (2) into the distribution apertures 2116B of the second row, and thus to a middle slide 2118B; and (3) between the distribution apertures 2116A and 2116B to an uppermost slide 2118C at the distribution pan downstream end 2106. Each of these routes thereby supplies product to a respective rogue product removal pan 2202 in the rogue product removal frame 2200 of FIG. 11 (with three stacked rogue product removal pans being used in the rogue product removal frame 2200, and only the uppermost rogue product removal pan 2202 being clearly visible in FIG. 11).

Turning next to the rogue product removal pans 1202/2202, the rogue product removal pan 1202 of FIGS. 1 and 2 is provided on the product distribution frame 1100 along with the distribution pan 1102, whereas the rogue product removal pans 2202 of FIGS. 8-9 and 11—there being three such vertically spaced pans 2202, each receiving product from one of the slides 2118A/2118B/2118C—are provided on their own rogue product removal frame 2200 (though each rogue product removal pan 2202 is preceded by a short featureless secondary distribution pan 2204 to allow product from the slides 216 time to spread across its width). Looking particularly to FIG. 2 for the rogue product removal pan 1202, and FIG. 11 for the stacked rogue product removal pans 2202 (with only the uppermost pan in the stack being discussed below), each rogue product removal pan 1202/2202 includes several product acceptance lanes 1206/2206 (which are perhaps best seen in FIGS. 3-4 and 12-13). Each product acceptance lane 1206/2206 extends between a rogue product removal pan upstream end 1208/2208 and a rogue product removal pan downstream end 1210/2210, and includes a product acceptance channel 1212/2212, a deflector 1214/2214, and a culling aperture 1216/2216 (with some culling apertures 1216/2216 being shared between product acceptance lanes 1206/2206). Each product acceptance channel 1212/2212 is laterally bounded by opposing sidewalls 1218A/2218A and 1218B/2218B, between which product rides toward the rogue product removal pan downstream end 1210/2210 as the rogue product removal pan 1202/2202 is vibrated. In the exemplary forms depicted, the product acceptance channels 1212/2212 have a V-shape defined by an inner sidewall 1218A/2218A and an outer sidewall 1218B/2218B, with the outer sidewall 1218B/2218B being situated between the inner sidewall 1218A/2218A and the culling aperture 1216/2216, and with the product acceptance channels 1212/2212 being paired such that their inner sidewalls 1218A/2218A join at their uppermost edges. Each deflector 1214/2214 has a deflector length extending from an inner location 1220/2220 above the inner sidewall 1218A/2218A of its product acceptance channel 1212/2212 to an outer location 1222/2222 above its outer sidewall 1218B/2218B, with the deflector 1214/2214 extending increasingly across the width of the product acceptance channel 1212/2212 as it extends toward the rogue product removal pan downstream end 1210/2210 (so that the deflector 1214/2214 is at an obtuse angle with respect to the upstream length of the product acceptance channel 1212/2212). A product passage 1224/2224 is defined below the deflector 1214/2214 and above the product acceptance channel 1212/2212. As seen in FIGS. 2-3, each deflector 1214/2214 may define a bridge joined to the rogue product removal pan 1202 on opposite sides of its product acceptance channel 1212, with the product passage 1224/2224 being beneath the bridge. Referring to FIGS. 2-4 and 11-13, each culling aperture 1216/2216 is then defined in the rogue product removal pan 1202/2202 alongside the product acceptance channel 1212/2212 and its deflector 1214/2214. As a result, product traveling along the product acceptance channels 1212/2125 may be dislodged from the product acceptance channels 1212/2212 by the deflectors 1214/2214, to fall into the culling apertures 1216/2216 between the outer sidewalls 1218B/2218B of adjacent pairs of product acceptance channels 1212/2212, if the product is not aligned to pass through the product passages 1224/2224. The outer sidewalls 1218B/2218B may have lesser height adjacent to the culling apertures 1216/2216 to assist the deflectors 1214/2214 with dislodging misaligned product from the product acceptance channels 1212/2212.

The rogue product removal pans 1202/2202 may include other features as well. To assist in urging product into the product acceptance channels 1212/2212, wedges 1226/2226 may be situated between pairs of the product acceptance channels 1212/2212, and between their culling apertures 1216/2216 and the rogue product removal pan upstream end 1208/2208. In similar respects, to assist each deflector 1214/2214 with removal of misaligned product, each deflector 1214/2214 may be preceded by a guidewall 1228/2228 which extends alongside, and rises above, the deflector's adjacent product acceptance channel 1212/2212, with the deflector 1214/2214 extending at an obtuse angle with respect to the guidewall 1228/2228. Other optional features shown in the alternative rogue product removal pan 3202 of FIGS. 21-22 are particularly useful where the foodstuff or other product being conveyed is not roughly symmetric about its lengthwise axis, for example, with curved sausages and the like. In this instance, a product opening 3230 may be defined in the bottom of the product acceptance channel 3212, with the product opening width extending across at least one half of the product acceptance channel width, and a length extending along the product acceptance channel length which is at least as great as the product opening width. If a curved sausage or other foodstuff is traveling along the product acceptance channel 3212 with its concave side facing downwardly—i.e., with the foodstuff riding on its opposing ends—a product opening 3230 of appropriate side and shape may catch the leading end of the foodstuff, and the foodstuff may fall through the product opening 3230 to be collected with the other products that fell into the culling apertures 3216. The product acceptance channels 3212 may also include reorientation guide surfaces 3232 therein which extend from one of the sidewalls 3218A or 3218B toward the other of the sidewalls 3218B or 3218A (preferably with a continuous curve), which can help ensure that all product leaving the rogue product removal pan 3202 is aligned/oriented in the same direction (for example, in FIGS. 21-22, that all product leaving the rogue product removal pan 3202 rests on a side edge with leftward inclination).

Misaligned product which falls into the culling apertures 1216/2216 of the rogue product removal pan 1202/2202 may fall to an inclined surface, and/or to a slide 2234 (visible in FIGS. 9 and 11), along which the product may vibrate and/or slide to a receiving end 1302/2302 of the recycling conveyor 1302/2300 (see particularly FIGS. 1 and 8-9). The recycling conveyor 1302/2300 then conveys the culled product to a conveyor depositing end 1304/2304 situated to supply product to the rogue product removal pan upstream end 1208/2208, for example, at the distribution pan 1102/2102 or some other location upstream from the rogue product removal pan 1202/2202. The product may then be passed through the rogue product removal pan 1202/2202 if properly aligned, or may otherwise again be culled if misaligned. Recycling conveyors are known in the conveyor field, for example, in the patents noted earlier in this document; to illustrate orbital recycling conveyors of the type 1300 seen in FIG. 1 are discussed in U.S. Pat. No. 8,181,592 (see FIGS. 8 and 9 therein), and linear recycling conveyors of the type 2300 seen in FIGS. 8-9 are discussed in the same patent (see FIGS. 1-7 therein, though there the conveyor uses an auger conveyor rather than a belt with flights/paddles as in recycling conveyor 2300). Thus, if further details regarding recycling conveyors 1300/2300 are desired, the reader is directed to the patents noted earlier in this document, and to the patents cited in (and citing to) these patents. Typically, a linear recycling conveyor 2300 is preferable for use with longer and/or more fragile product, with an orbital recycling conveyor 1300 being better for use with shorter and more durable product.

Product is then transferred to the path adjustment frames 1400/2400, wherein the path adjustment frame 1400 (see FIG. 5) has a single path adjustment pan 1402, and the path adjustment frame 2400 (see FIG. 14) has three vertically stacked path adjustment pans 2402 (only the uppermost one being clearly visible), each receiving product from one of the stacked rogue product removal pans 2202. Each path adjustment pan 1402/2402 has multiple path adjustment lanes 1404/2404, with each path adjustment lane 1404/2404 extending from a path adjustment pan upstream end 1406/2406 aligned with a respective one of the product acceptance lanes 1206/2206 at the rogue product removal pan downstream end 1210/2210, to a path adjustment pan downstream end 1408/2408. The path adjustment lanes 1404/2404 of the path adjustment pans 1402/2402 are intended to remove the spacing added between lanes of product owing to the culling apertures 1216/2216 of the rogue product removal pans 1202/2202, and situate adjacent items of product such that they have (at least roughly) the relative spacing that they are to have when they are finally packaged. In FIGS. 5 and 14, the path adjustment lanes 1404/2404 move the product from more widely-spaced lanes at the path adjustment pan upstream ends 1406/2406 to more narrowly-spaced lanes at the path adjustment pan downstream ends 1408/2408. Thus, the path adjustment lanes 1404/2404 are not parallel to each other, unlike the illustrated product acceptance lanes 1206/2206 of the rogue product removal pans 1202/2202.

The path adjustment pans 1402/2402 of the vibratory conveyor systems 1000 and 2000 have different forms, with the path adjustment lanes 1404 of the vibratory conveyor system 1000 of FIG. 1—best seen in FIG. 5—including trough-like path adjustment channels 1410 depressed into the path adjustment pan 1402. Each path adjustment channel 1410 is preferably provided with a path adjustment channel cover 1412 with a concave lower surface (not visible in the drawings), such that the concave lower surface defines a roof over the adjacent path adjustment channel 1410. Thus, each path adjustment channel 1410 and path adjustment channel cover 1412 together define a tubular path adjustment lane 1404 (having desired cross-sectional shape, here the shape of a square resting on one corner), wherein the path adjustment channel cover 1412 helps prevent product from bouncing out of the adjacent path adjustment channel 1410. The path adjustment channel covers 1412 are preferably adjustably respaceable with respect to their adjacent path adjustment channels 1410, thereby allowing the path adjustment lanes 1404 to better accommodate differently-sized product, and they also preferably have product viewing apertures 1414—shown as elongated slots extending along the lengths of the path adjustment channel covers 1412—which allow users (and/or photosensors) to see product traveling through the path adjustment lanes 1404, and to dislodge any product that might get stuck therein.

In contrast, the path adjustment lanes 2402 of the vibratory conveyor system 2000 of FIGS. 8-9 (best seen in FIG. 14) are defined as individual tubes fixed by brackets 2416 into desired paths along the path adjustment pan 2402, and which bear product viewing apertures 2414 along their lengths.

Depending on the applications involved, the path adjustment pans 1402/2402 may include mechanisms for metering product from their path adjustment pan downstream ends 1408/2408. In the path adjustment pan 1402 of FIG. 5, this is done by path adjustment product stop actuators 1418 (e.g., pneumatic cylinders, solenoids, or the like) situated slightly upstream from the path adjustment pan downstream end 1408. The path adjustment channel covers 1412 end slightly upstream from the path adjustment product stop actuators 1418, such that path adjustment product stops 1420 descending from the path adjustment product stop actuators 1418 may each be actuated to move toward a respective path adjustment channel 1410 and thereby obstruct product travel within the channel. In FIG. 5, the path adjustment product stops 1420 are depicted in the form of elongated members with concave lower surfaces, similar to the path adjustment channel covers 1412 but having short length. The path adjustment product stops 1420 may be actuated by the path adjustment product stop actuators 1418 to clamp down on (or obstruct) product within the path adjustment channels 1410 and hold it in place until release is desired.

In the vibratory conveyor system 2000 of FIGS. 8-9, an optional product accumulator frame 2500 (see FIG. 16) is then provided to accumulate a supply of product, and thereby better ensure a constant product supply for the succeeding product loader 2600. The product accumulator frame 2500 has a product accumulation pan 2502 resembling the path adjustment pan 2402, but with parallel product-bearing lanes 2504.

The product is then received by the product loaders 1600/2600, which serve to dispense ordered "bundles" of product to packaging systems, e.g., to container fill-and-seal systems. The product loader 1600 of the vibratory conveyor system 1000 of FIG. 1, which is shown in greater detail in FIG. 7, has four product loading lanes 1602. Each product loading lane 1602 has a product loading lane length extending between a product loader upstream end 1604 situated to receive product from four of the path adjustment lanes 1404 of the path adjustment frame 1400 of FIG. 6, and an opposing product loader downstream end 1606. The product loading lane width, which is oriented perpendicular to the product loading lane length, is bounded by opposing product loading lane walls 1608. The floor of each product loading lane 1602 is defined by an endless belt 1610 having a belt upper surface which travels from the product loader upstream end 1604 to the product loader downstream end 1606 when the belt 1610 rotates. Several gates 1612A, 1612B, 1612C, and 1612D, which swing upwardly from and downwardly toward the product loading lanes 1602 on gate arms 1614 (which rotate about arm axes 1616), are configured to reversibly move toward the product loading lane 1602 and thereby obstruct product travel therein. Thus, the belt 1610 may transport product along each product loading lane 1602 from the product loader upstream end 1604 to the product loader downstream end 1606, and at the same time, the gates 1612A, 1612B, 1612C, and 1612D may occasionally be moved toward their product loading lanes 1602 to obstruct product travel. A preferred mode of operation is to hold shut the uppermost (first) gate 1612A, which is situated adjacent the product loader upstream end 1604, as the path adjustment product stops 1420 of the path adjustment frame 1400 (FIG. 5) are lifted and a row of product is released from the path adjustment lanes 1404. A row of product will therefore be held in the path adjustment lanes 1404 behind the uppermost (first) gate 1612A. The second and third gates 1612B and 1612C may then be opened while the lowermost (final) gate 1612D is shut, and the uppermost (first) gate 1612A may be opened to have the belt 1610 carry the row of product toward the product loader downstream end 1606 until it encounters (and is restrained behind) the lowermost (final) gate 1612D. The uppermost (first) gate 1612A is again closed, along with the third gate 1612C, and the path adjustment product stops 1420 are again lifted to have a row of product accumulate behind the uppermost (first) gate 1612A. When the uppermost (first) gate 1612A is lifted, the row of product is carried on the belt 1610 toward the product loader downstream end 1606 until it encounters (and is restrained behind) the third gate 1612C. (During this time, the belt 1610 simply rotates beneath the first row of product held behind the final gate 1612D.) The uppermost (first) gate 1612A is again closed, along with the second gate 1612B, and the path adjustment product stops 1420 are again lifted to have a row of product accumulate behind the uppermost (first) gate 1612A. When the uppermost (first) gate 1612A is lifted, the row of product is again carried on the belt 1610 toward the product loader downstream end 1606 until it encounters (and is restrained behind) the second gate 1612B. The uppermost (first) gate 1612A is then closed, with the lowermost (final) gate 1612D, third gate 1612C, and second gate 1612B each holding a row of product on the belt 1610. These gates 1612B, 1612C, and 1612D may then be lifted to have the belt 1610 transport the three rows of product forwardly to drop them into one or more containers (which are preferably fed beneath the product loader downstream end 1606 at the same rate as the travel of the belt 1610, such that the product tends to be placed in the containers in rows).

FIGS. 17-20 then show six sets of product loaders 2600, with a pair of them being used with each of the three vertically stacked tiers of the vibratory conveyor system 2000 of FIGS. 8-9 along which product is conveyed. Each product loader 2600 has a product loading pan 2610 (FIG. 18) with an upstream pan section 2604 (having an upstream pan section upstream end 2618 and an upstream pan section downstream end 2620), a downstream pan section 2606 (having a downstream pan section upstream end 2622 and an opposing downstream pan section downstream end 2624), and a downstream pan section actuator 2626 (FIGS. 19-20) configured to move the downstream pan section 2606 in a downstream direction with respect to the upstream pan section 2604. The upstream and downstream pan sections 2604 and 2606 have multiple product loading channels 2602 defined therein (see FIG. 18), with each product loading channel 2602 extending across the upstream pan section 2604 and the downstream pan section 2606 from the upstream pan section upstream end 2618 to the downstream pan section downstream end 2624. Each product loading channel 2602 is situated to receive product at or adjacent the upstream pan section upstream end 2618 from a respective one of the product acceptance lanes 2206. A product loading pan cover 2628 is situated above the product loading pan 2610, and has a product loading pan cover lower surface 2630 having product loading pan cover channels 2632 defined therein. The product loading pan cover channels 2632 are each situated above a respective one of the product loading channels 2602 of the upstream pan section 2604, and also above a respective one of the product loading channels 2602 of the downstream pan section 2606. The product loading pan cover 2628 thereby cooperates with the product loading pan 2610 to define passages through which product can travel, similar to the path adjustment channel 1410 and path adjustment channel cover 1412 of FIGS. 5-6, with the product loading pan cover 2628 preferably being adjustably respaceable with respect to the product loading pan 2610 to better accommodate different sizes of product. Loader product viewing apertures 2634 extend from the upper surface of the product loading pan cover 2628 to open onto the product loading channels 2602, thereby allowing users (and/or photosensors) to view product beneath the product loading pan cover 2628. Product loader upstream stops 2612A, provided in the form of fingers on a comb-like member 2614 linked to an actuator 2616 (e.g., pneumatic cylinders, solenoids, or the like), are configured to reversibly move within the product viewing apertures 2634 toward the product loading channels 2602 at or near the upstream pan section upstream end 2618, and thereby prevent product from entering the product loading channels 2602. Product loader intermediate stops 2612B, which have a structure and function similar to those of product loader upstream stops 2612A, are configured to reversibly move within the product viewing apertures 2634 toward the product loading channels 2602 at or near the upstream pan section downstream end 2620, and thereby obstruct product travel in the product loading channels 2602 so that product can accumulate atop the upstream pan section 2604. Product loader downstream stops 2612B are also provided to extend through the product viewing apertures 2634 in fixed spaced relationship from the upstream pan section 2604, such that when the downstream pan section 2606 is not actuated to move in a downstream direction with respect to the upstream pan section 2604 (i.e., when positioned as in FIG. 19), the product loader downstream stops 2612B obstruct the product loading channels 2602 near the downstream pan section downstream end 2624. However, when the downstream pan section 2606 is actuated to move in a downstream direction with respect to the upstream pan section 2604 (i.e., when positioned as in FIG. 20), the product loader downstream stops 2612B travel through the product loading channels 2602 toward the downstream pan section upstream end 2622, and push product from the channels 2602.

The product loaders 2600 operate similarly to the product loader 1600 of FIG. 7, with the product loader stops 2612A, 2612B, and 2612C acting similarly to the gates 1612A, 1612B, 1612C, and 1612D. Looking particularly to FIG. 18, if the product loader upstream stops 2612A allow entry of product to the product loading channels 2602 from the product-bearing lanes 2504 of the product accumulator frame 2500 (FIG. 16), and if the product loader intermediate stops 2612B simultaneously obstruct further product travel, the upstream pan section 2604 may accumulate product in its product loading channels 2602. The product loader upstream stops 2612A may then be closed, and the product loader intermediate stops 2612B may be opened while the product loader downstream stops 2612C are closed, allowing the downstream pan section 2606 to receive product from the upstream pan section 2604 (with the product being held in the downstream pan section 2606 by the product loader downstream stops 2612C). The product loader intermediate stops 2612B may then be moved to again obstruct product travel, and the downstream pan section 2606 may be actuated from the state shown in FIG. 19 to move in a downstream direction with respect to the upstream pan section 2604 (as seen in FIG. 20). As it does so, the product loader downstream stops 2612C urge the product within the downstream pan section's product loading channels 2602 out of the downstream pan section upstream end 2622, and the product—which is situated in the ordered row defined by the product loading channels 2602—may drop into a container, web, or other package situated beneath the product loader 2600. With the six product loaders 2600 shown in FIG. 17—one for each of the three tiers in the stack of rogue product removal pans 2202 of FIG. 11, the stack of path adjustment pans 2402 of FIG. 14, and the stack of product accumulation pans 2502 of FIG. 16—six packages (or X packages having Y compartments, with X*Y=6) may be indexed under the product loaders 2600 for filling, and may then be indexed away.

Further features and advantages of the exemplary and other versions of the invention will be apparent from the remainder of this document in conjunction with the associated drawings.

BRIEF DESCRIPTION OF THE DRAWINGS

FIG. 19 is a bottom perspective view of one of the product loaders 2600 of FIGS. 17-18, showing the downstream pan section 2606 in a retracted state immediately adjacent the upstream pan section 2604.

FIG. 20 is a bottom perspective view of the product loader 2600 of FIG. 19, shown with its downstream pan section 2606 in an extended state with respect to the upstream pan section 2604.

FIG. 22 is a top view of the rogue product removal pan 3202 of FIG. 21.

Figure 1:
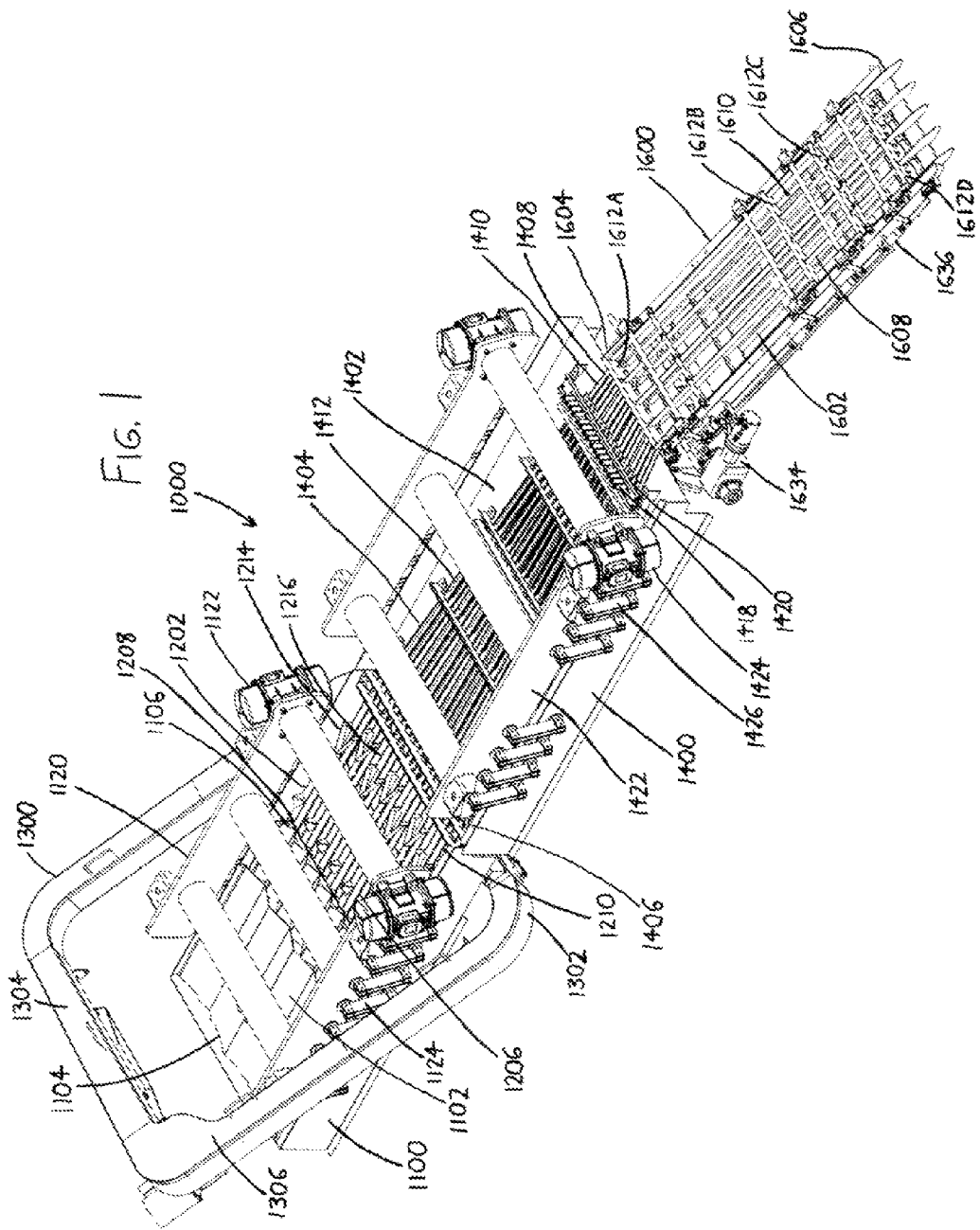
FIG. 1 is a perspective view of the exemplary vibratory conveyor system 1000 and its subassemblies (the product distribution frame 1100 with its shaker base 1120, the recycling conveyor 1300, the path adjustment frame 1400 with its shaker base 1422, and the product loader 1600).

It should be understood that the structures shown in the drawings are depicted in simplified form, with some minor structures (e.g., support frames, select vibrational input components, control boxes/sensors, etc.) being omitted, or being shown in simplified form, for sake of clarity. For example, in FIGS. 8-10, only the product distribution frame 2100 is shown mounted to an underlying shaker base 2120 (with shaker motor 2122) via spring arms 2124, and the remaining subassemblies are shown without any means of vibratory input to enhance clarity.

DETAILED DESCRIPTION OF EXEMPLARY VERSIONS OF THE INVENTION

Expanding on the discussion above, the vibratory conveyor system 1000 of FIG. 1, and its subassemblies illustrated in FIGS. 2-7, is particularly suitable for packaging of relatively hard cylindrical foodstuffs such as frozen taquitos/flautas, frozen egg rolls, and similar product. Looking to FIGS. 1-2, a conveyor, chute, or other product supply source may deposit the completed product on the upper tier 1108A of the distribution pan 1102 of the product distribution frame 1100. The product distribution frame 1100 is vibrated by an overhead shaker base 1120 (FIG. 1) bearing a shaker motor 1122, with the vibration of the shaker motor 1122 being transmitted to the product distribution frame 1100 via leaf/beam springs 1124. Owing to the elongated shape of the valleys 1110A/1110B/1110C of the distribution pan 1102, product will typically attempt to settle into the bottom of the valleys with its lengths aligned with the lengths of the valleys as the product vibrates from one tier 1108A/1108B/1108C to the next. When the product subsequently falls onto the rogue product removal pan 1202 (best seen in FIGS. 2-4), typically most of the product, but not all of it, has its lengths aligned with the lengths of the product acceptance lanes 1206. Thus, with particular reference to FIG. 3, most product will have its lengths fall into the product acceptance channels 1212, at which point it will be vibratorily transported down the product acceptance channels 1212 towards the rogue product removal pan downstream end 1210, passing beneath the deflector 1214 as it does so. However, product that falls onto the rogue product removal pan 1202 with its lengths at angles to the axes of the product acceptance lanes 1206 might encounter the wedges 1226, which will urge the lengths of the products to fall into the product acceptance channels 1212; or, if this fails, the lengths might fall into the product acceptance channels 1212 upon encountering the guidewall 1228. If these measures fail, and the product cannot pass through the product acceptance channel 1212 beneath the deflector 1214, the product will either naturally fall into a culling aperture 1216, or will be urged into a culling aperture 1216 via the deflector 1214. For optimal culling of misaligned product, it is important that the passage defined between the deflector 1214 and the product acceptance channel 1212 be sized/configured such that only a single properly-oriented product can fit beneath the deflector 1214, with the deflector 1214 pushing misaligned and/or stacked product out of the product acceptance lanes 1206 and into the culling apertures 1216. So long as product passes the deflector 1214, it continues to the rogue product removal pan downstream end 1210, and subsequently to the path adjustment frame 1400 of FIGS. 1 and 5. Otherwise, product falling through the culling apertures 1216 falls into a chute 1126 (FIG. 2) which provides the culled product to the recycling conveyor 140 (FIG. 1). The culled product could instead be removed from the processing line for disposal or other use, but it is typically most economical to attempt to salvage the product, and the vibratory conveyor system 1000 does so by cycling the culled product through the rogue product removal pan 1202 until it achieves proper alignment, and successfully passes through the rogue product removal pan 1202.

The recycling conveyor 1300 of FIG. 1 is merely exemplary, and other types of recycling conveyors (e.g., the recycling conveyor 2300 of FIGS. 8-9), or other systems for returning culled product upstream, may be used instead. While not shown in the drawings, the recycling conveyor 1300 has, within its enclosure 1306, a belt traveling about the inner diameter of the loop of the enclosure 1306, and which bears paddles extending outwardly toward the outer diameter of the loop of the enclosure 1306. Thus, when product is deposited by the chute 1126 into the (bottom) receiving end 1302 of the recycling conveyor 1300—where the enclosure 1306 is open, such that the deposited product falls between the paddles of the belt—the belt and paddles convey the deposited product upwardly to the (top) depositing end 142 of the recycling conveyor 1300. At the depositing end 1304, the enclosure 1306 is open at its bottom (not shown) so that the product falls out of the recycling conveyor 1300, and back onto the distribution pan 1102 of the product distribution frame 1100.

Figure 5:
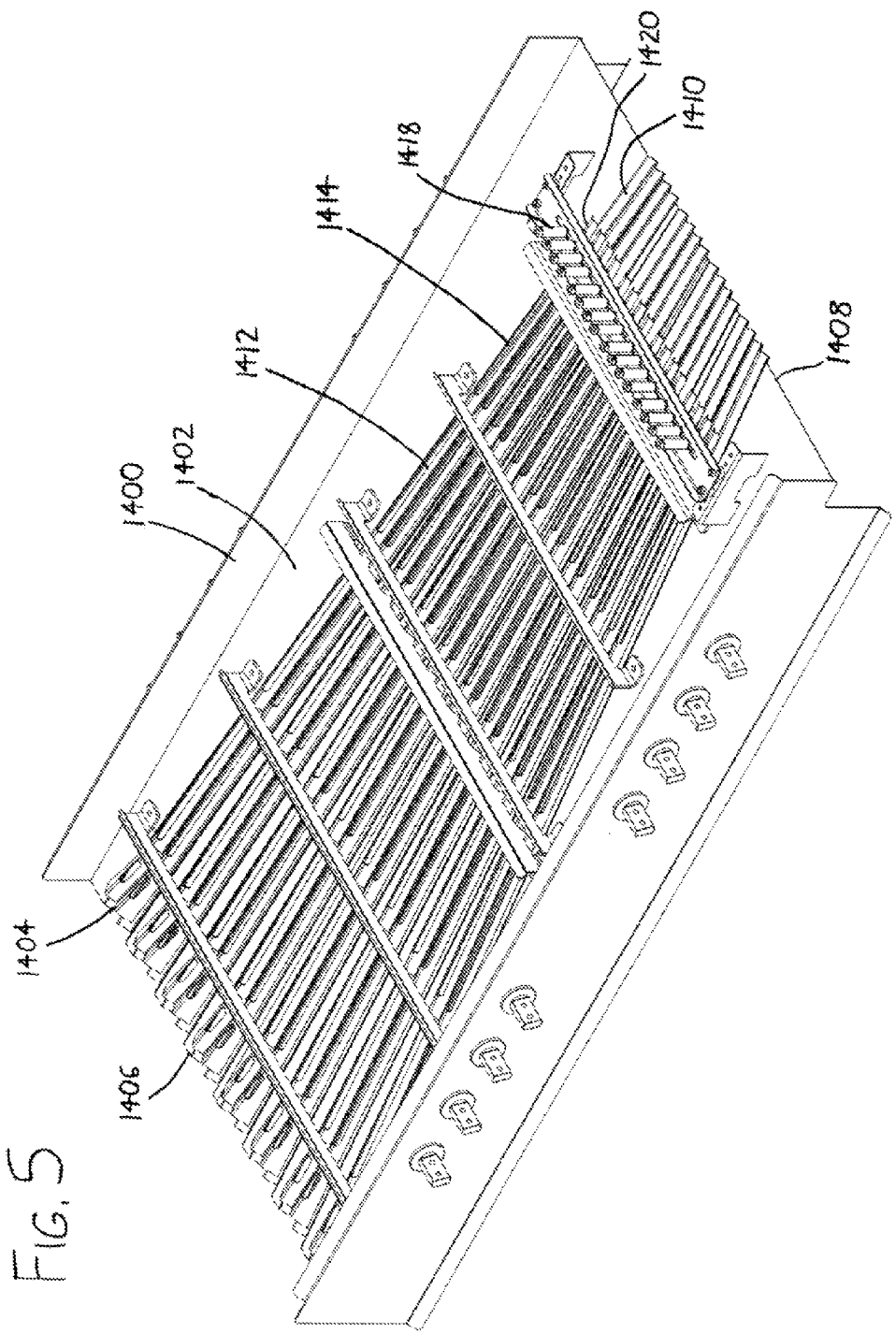
FIG. 5 is a more detailed perspective view of the path adjustment frame 1400 of FIG. 1, illustrating the path adjustment pan 1402 and the path adjustment channels 1410 therein without the overhanging shaker base 1422 shown in FIG. 1.
Figure 6:
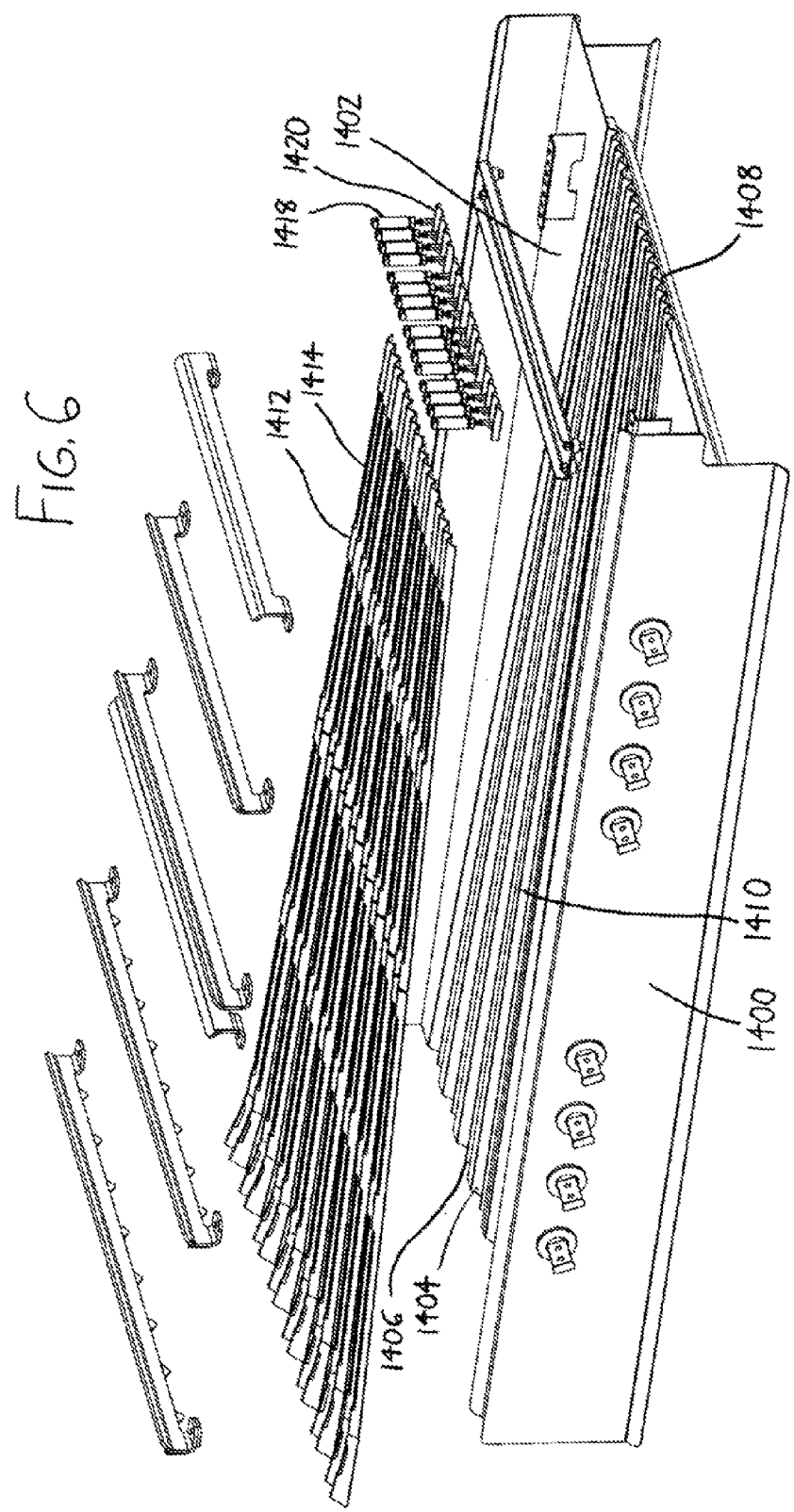
FIG. 6 is a partially exploded perspective view of the path adjustment frame 1400 of FIG. 5, providing more detail regarding the path adjustment channels 1410 and channel covers 1412 that define the path adjustment lanes 1404, and also illustrating the path adjustment product stop actuators 1418 and their product stops 1420 in greater detail.

Product which achieves proper alignment on the rogue product removal pan 1202 is then passed to the path adjustment lanes 1404 of the path adjustment frame 1400 (FIGS. 1 and 5). As with the product distribution frame 1100, the path adjustment frame 1400 is oscillated by an overhead shaker base 1422 (FIG. 1) bearing a shaker motor 1422, and which transmits vibration to the path adjustment frame 1400 via spring arms 1426. Looking to FIGS. 5-6, the product is vibrated down the path adjustment channels 1410 of the path adjustment lanes 1404 while being held within the channels 1410 by the path adjustment channel covers 1412. Product typically lows best within the "tunnels" defined by the channels 1410 and channel covers 1412 if the tunnel dimensions are sized approximately 1.5 times larger than the corresponding product dimensions. The presence, number, speed, etc. of product can be monitored manually, or by automated means (e.g., via photosensors), through the product viewing apertures 1414 defined in the channel covers 1412. These viewing apertures 1414 can also be used to dislodge product in the event it should get stuck in a path adjustment lane 1404 (which is atypical, but can occur when product is malformed, broken, or otherwise misshapen). Near the path adjustment pan downstream end 1408, product traveling in the path adjustment channels 1410 emerges from under the path adjustment channel covers 158, and can be restrained by the path adjustment product stops 1420 for subsequent feeding to the product loader 1600 (FIGS. 1 and 7).

Figure 7:
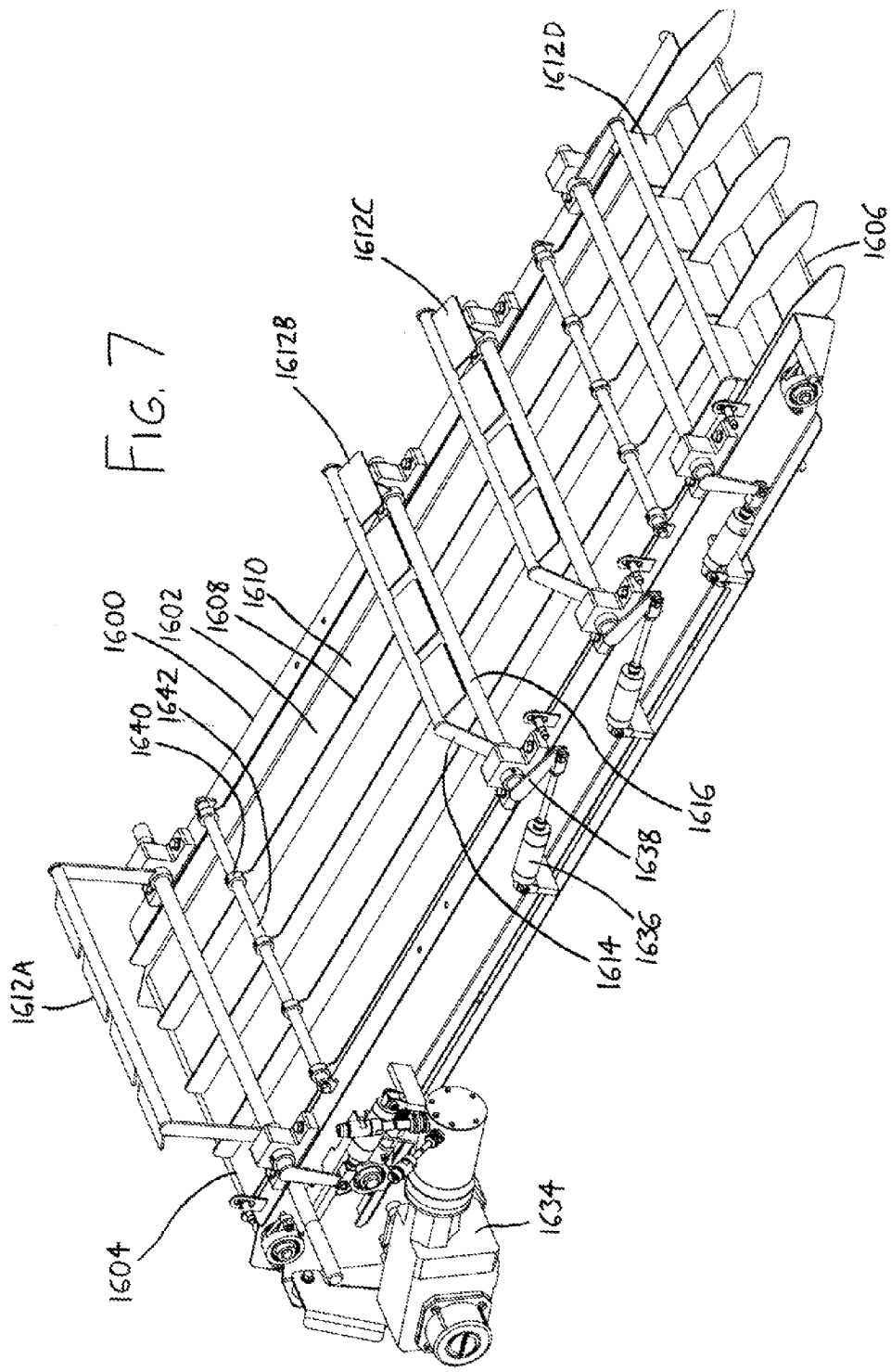
FIG. 7 is a detailed perspective view of the product loader 1600 of FIG. 1, illustrating the product loading lanes 1602 in which product travels, and the gates 1612A, 1612B, 1612C, and 1612D used to meter the product through the lanes 177.

As previously discussed, the upper gate 1612A of the product loader 1600 of FIG. 7 selectively admits rows of product from the path adjustment frame 1400 onto the product loading lanes 1602 atop the belt 1610, with each of the lower gates 1612B/1612C/1612D then holding a row for subsequent release to a container. The belt 1610 is driven by a motor and gearbox 1634, whereas the gates 1612A/1612B/1612C/1612D are opened and closed by actuators 1636 driving lever arms 1638 extending from the gate axes 1616, with the lever arms 1638 rotating the gate arm axes 1616 to swing the gate arms 1614 (and thus the gates 1612A/1612B/1612C/1612D) upwardly and downwardly. The product loading lanes 177 are defined by product loading lane walls 1608 affixed to collars 1640, which may be slidably relocated along transverse bars 1642 extending across the width of the product loader 1600 to adjust the sizes and locations of the product loading lanes 1602, and which may then be engaged to the transverse bars 1642 with screws to fix the product loading lane walls 1608 in place.

To review the operation of the product loader 1600 of FIGS. 1 and 7 in greater detail, its uppermost gate 1612A is initially closed as product travels down the path adjustment lanes 1404 of the path adjustment frame 1400 (FIG. 5), causing product to accumulate in the path adjustment lanes 1404 behind the gate 1612A. The path adjustment product stops 1420 are spaced sufficiently upstream from the path adjustment pan downstream end 1408 that a single row of product may occupy the path adjustment channels 1410 downstream from the path adjustment product stops 1420. Thus, once a row of product occupies the path adjustment lanes 1404 downstream from the path adjustment product stops 1420 (as detected by photosensors or the like), the path adjustment product stops 1420 can be actuated by the path adjustment product stop actuators 1418 to engage the next upstream row of product riding in the path adjustment lanes 1404. Thus, when the uppermost gate 1612A (FIG. 7) is opened (with the second and third gates 1612B and 1612C also being open), the row of product at the path adjustment pan downstream end 1408 enters the product loader 1600, and is transported down the belt 1610 in the four product loading lanes 1602 between the lane walls 1608. The row of product then halts once it encounters the lowermost gate 1612D. The uppermost gate 1612A is then closed. The path adjustment product stop actuators 1418 (FIG. 5) are again actuated to release another row of product to abut the uppermost gate 1612A, with the actuators 1418 then again being actuated to clamp down on the next upstream row of product in the path adjustment lanes 1404. With the third gate 1612C closed and the second gate 1612B open, the upper gate 1612A is again opened to allow the row of product at the path adjustment pan downstream end 1408 to travel down the belt 1610 until it abuts the third gate 1612C. The first and second gates 1612A and 1612B are then closed, the path adjustment stop actuators 1418 (FIG. 5) are again actuated to release one row of product and subsequently clamp down on the next upstream row, and the released row of product accumulated behind gate 1612A is admitted to the belt 1610 to accumulate behind the second gate 1612B when gate 1612A is lifted. Gate 1612A is then closed, and gates 1612B, 1861C, and 1612D are all simultaneously opened while the belt 1610 is indexed forward and while one or more containers are indexed beneath the product loader downstream end 1606. In the configuration shown in FIG. 7—with four product loading lanes 1602 and three lower gates 1612B/1612C/1612D—the product loader 1600 can fill twelve containers, or twelve compartments in one or more containers. More or fewer containers/compartments could be filled depending on the number of product loading lanes 1602 and gates 1612B/1612C/1612D provided.

Figure 8:
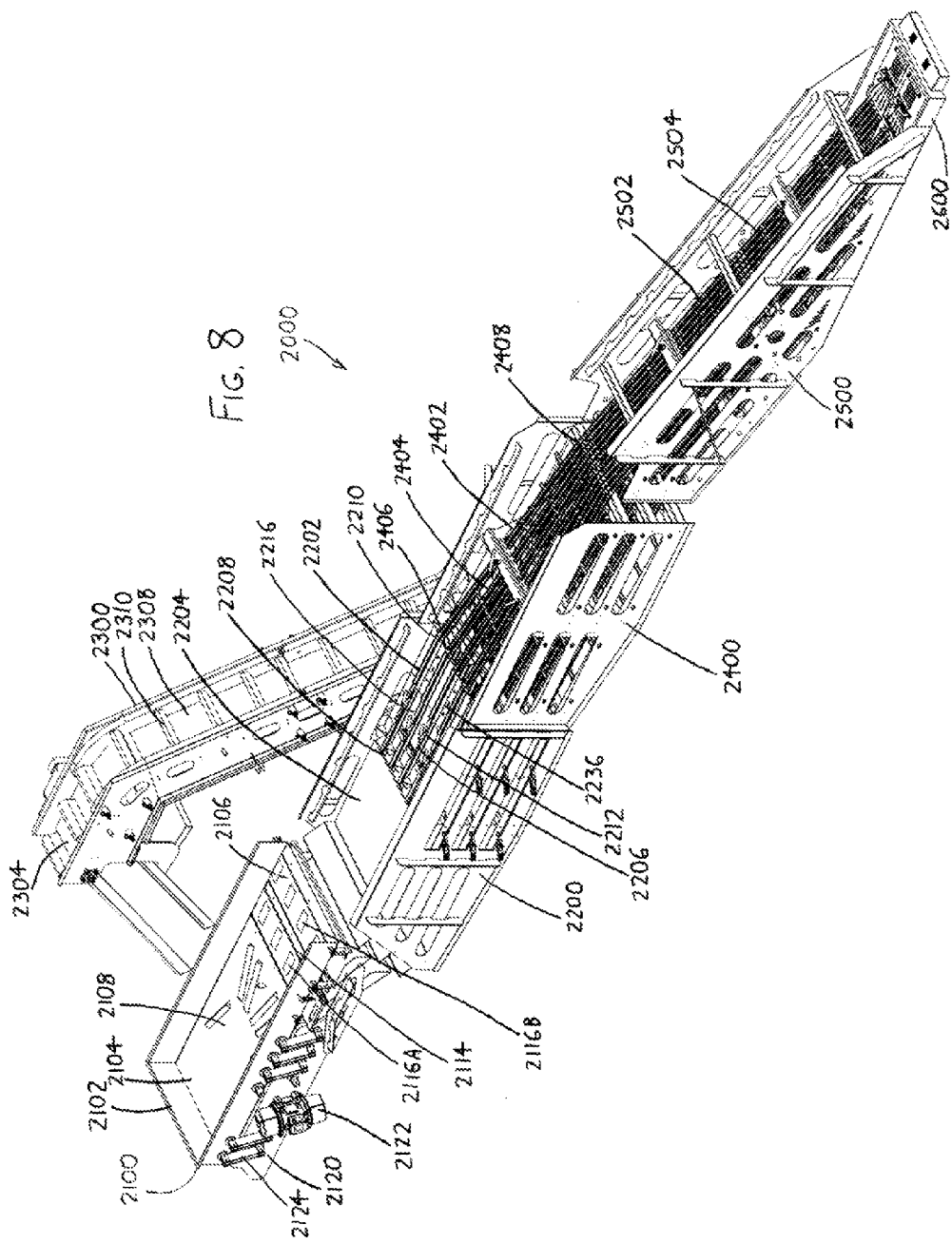
FIG. 8 is a front perspective view of the exemplary vibratory conveyor system 2000 and its subassemblies (the product distribution frame 2100, the rogue product removal frame 2200, the recycling conveyor 2304, the path adjustment frame 2400, the product accumulator frame 2500, and the product loader 2600).
Figure 9:
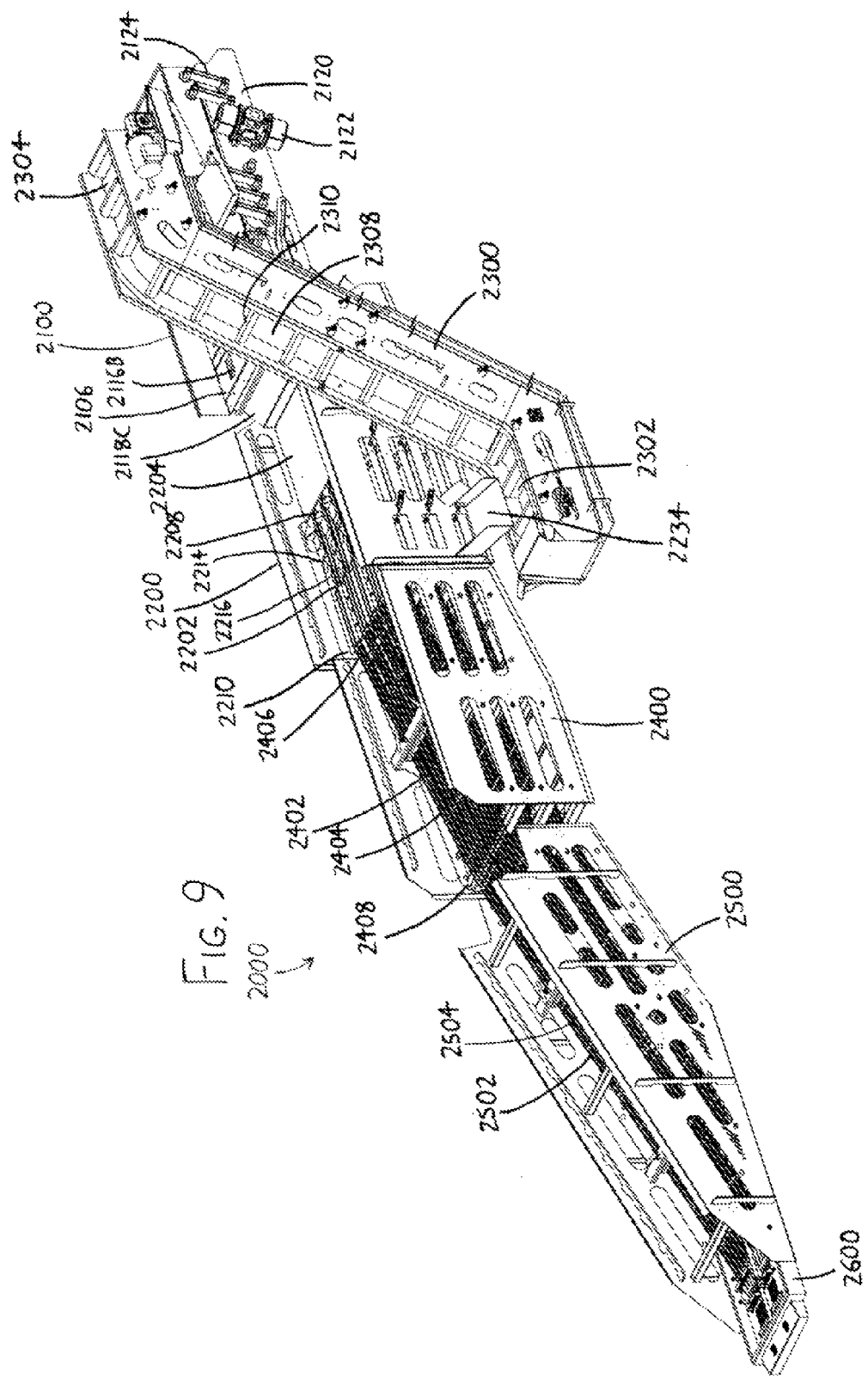
FIG. 9 is a rear perspective view of the vibratory conveyor system 2000 of FIG. 8.

The vibratory conveyor system 2000 of FIGS. 8-9, and its subassemblies illustrated in FIGS. 10-20, is particularly designed for packaging of softer cylindrical foodstuffs such as sausages and the like. Looking to the product distribution frame 2100 of FIG. 10, the distribution pan 2102 includes the horizontal spreading portion 2108 (with its horizontal spreading vanes 2112), and the vertical spreading portion 2114 (with its apertures 2116A and 2116B), both of which are preferably provided as separate modular subcomponents of the distribution pan 2102 so that one or both portions 2108 and 2114 can be removed and replaced. The vertical spreading portion 2114 is itself preferably provided in two sections which are slidably and removably mounted on the product distribution frame 2100, each section including one of the rows of apertures 2116A and 2116B, whereby the apertures 2116A and 2116B can be relocated across the width of the distribution pan 2102. By translating one or both sections in the transverse direction (across the width of the distribution pan 2102), the location of the apertures 2116A and 2116B can be altered to adapt the distribution of product to the three tiers of the vibratory conveyor system 2000.

Figure 11:
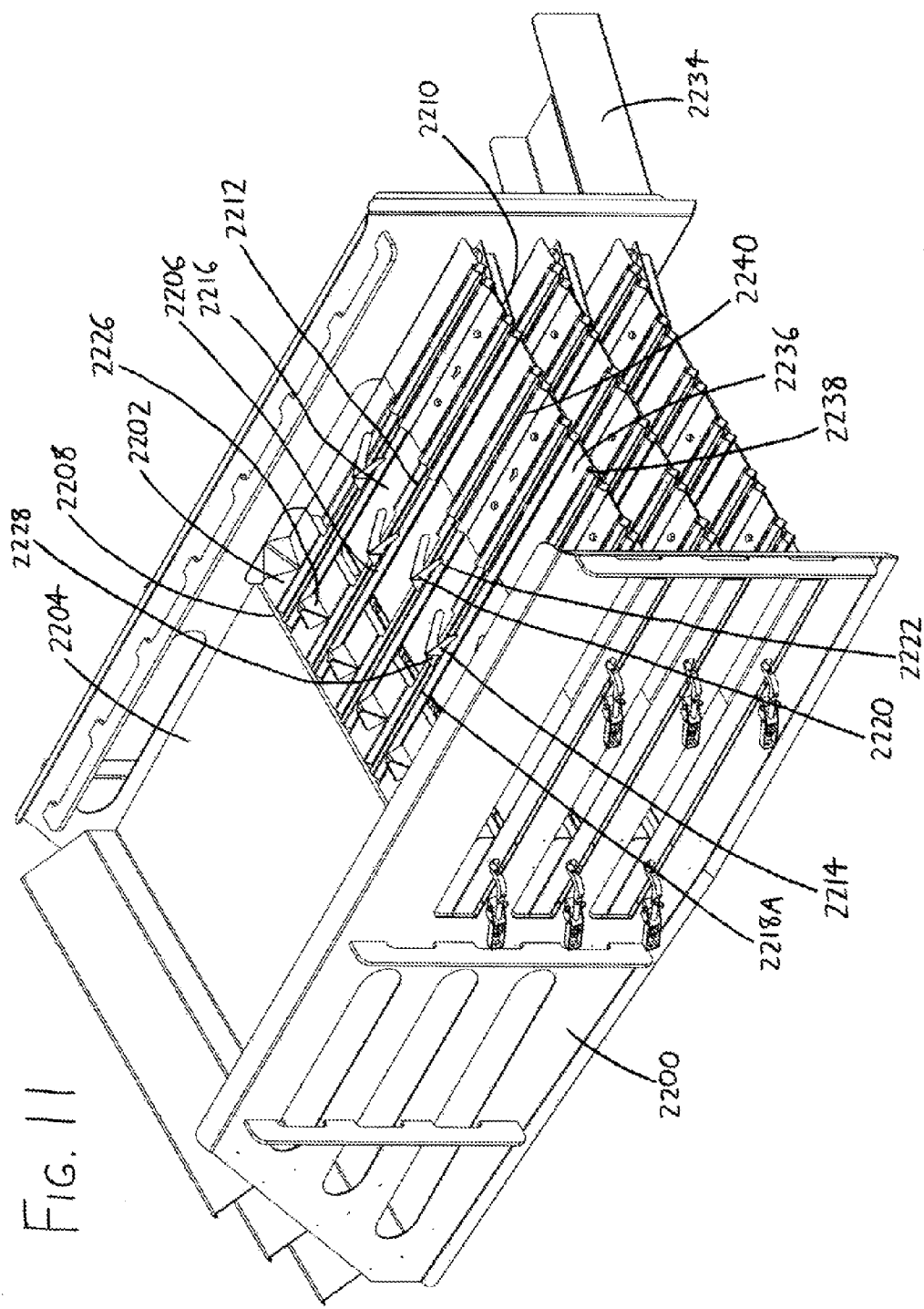
FIG. 11 is a perspective view of the rogue product removal frame 2200 of FIGS. 8-9, illustrating its secondary distribution pan 2204 and rogue product removal pan 2202 in greater detail.
Figure 12:
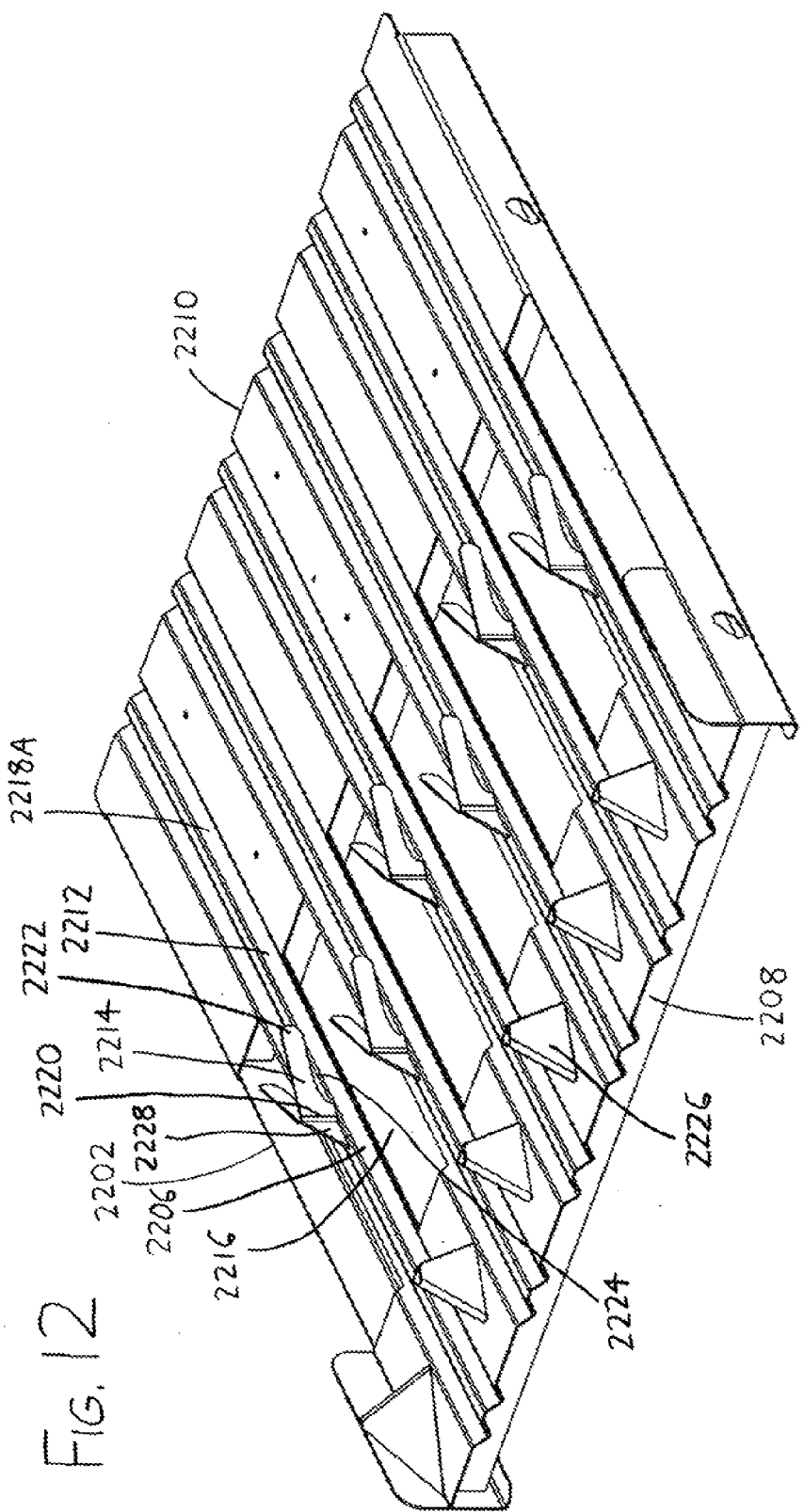
FIG. 12 is a perspective view of the rogue product removal pan 2202 of the rogue product removal frame 2200 of FIG. 11, shown from its upstream end 2208.
Figure 13:
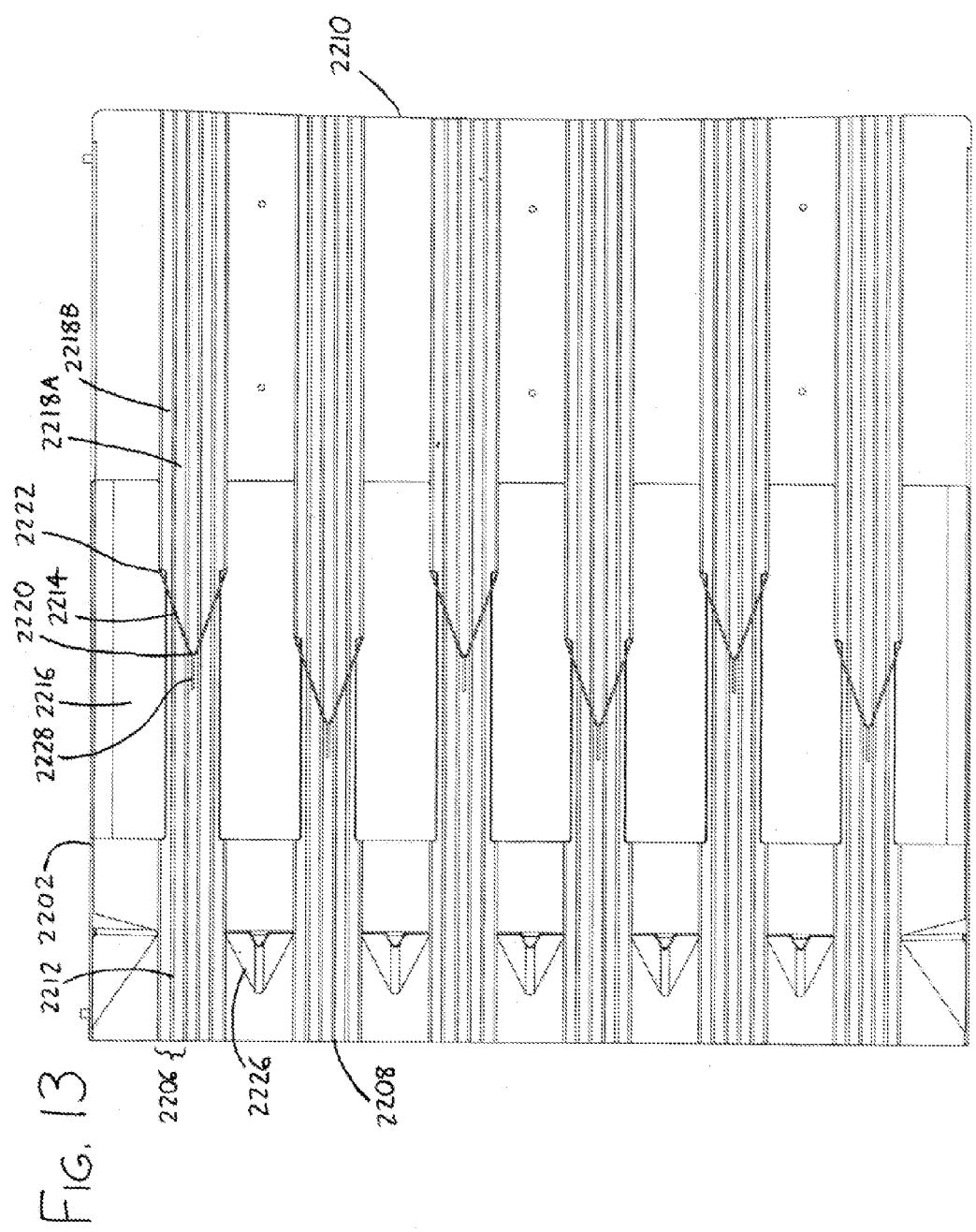
FIG. 13 is a top view of the rogue product removal pan 2202 of FIGS. 11-12.

FIG. 11 then provides a more detailed view of the rogue product removal frame 2200 of the vibratory conveyor system 2000, including its three tiers of rogue product removal pans 2202. While not shown in FIGS. 12-13 (and not readily visible in FIGS. 8-9), it is seen in FIG. 11 that the rogue product removal pan downstream end 2210 includes a downstream end cover 2236 which rests across the rogue product removal frame width, and which has channels 2238 defined in its lower surface. When the cover 2236 is placed over the rogue product removal pan downstream end 2210, the channels 2238 rest over the product acceptance channels 2212 in the rogue product removal pan 2202, thereby defining "tunnels" through which product can pass (similar to the path adjustment channels 1410 and channel covers 1412 of the path adjustment frame 1400 of FIGS. 5-6, and the path adjustment lanes 2402 of the path adjustment frame 2400 of FIGS. 14-15). As discussed previously, having product travel through such enclosed tunnels can help deter accidental dislodgement and "bounce-out" of product from the product acceptance channels 2212. Viewing apertures 2240 are also provided in the cover 2236 over the channels 2238 to allow manual or automated viewing of product, and to ease in dislodgement of product should it get stuck. As perhaps best seen in FIGS. 12-13, the rogue product removal pan 2202 also differs from the rogue product removal pan 1202 of FIGS. 2-4 in that its deflectors 2214 overhang their product acceptance channels 2212 in cantilever fashion, rather than being joined to opposing sides of the product acceptance channels in bridge-like fashion, as with the deflectors 126 of FIGS. 2-4.

Referring back to FIGS. 8-9, the recycling conveyor 2300 receives misaligned product culled by the rogue product removal pan 2202 via the slide 2234 (FIGS. 9 and 11) of the rogue product removal frame 2200. The recycling conveyor 2300 includes an endless belt 2308 bearing paddles 2310, wherein culled product falls onto the belt 2308, and between the paddles 2310, for conveyance from the conveyor's lower receiving end 2302 to its upper depositing end 2304. The depositing end 2304 (best seen at FIG. 8) provides the culled product back into the processing stream upstream from the rogue product removal pan 2202, e.g., onto the distribution pan 2102 of the product distribution frame 2100, or onto the secondary distribution pan 2204 of the rogue product removal frame 2200, where it then has a second chance to attempt to traverse the product acceptance lanes 2206 of the rogue product removal pan 2202 with proper alignment.

Figure 14:
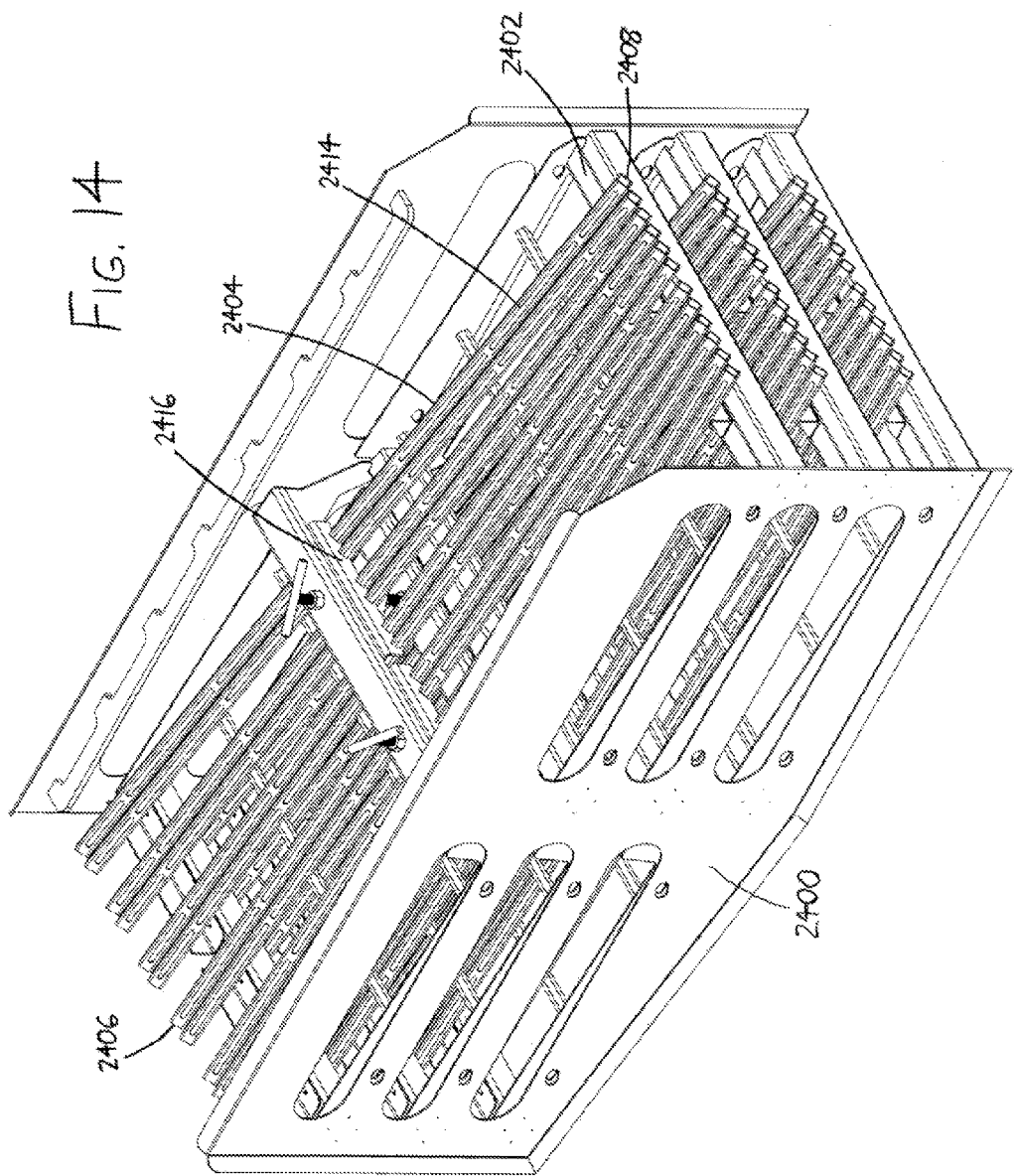
FIG. 14 is a more detailed perspective view of the path adjustment frame 2400 of FIGS. 8-9, illustrating the path adjustment lanes 2402 of its path adjustment pan 2402.
Figure 15:
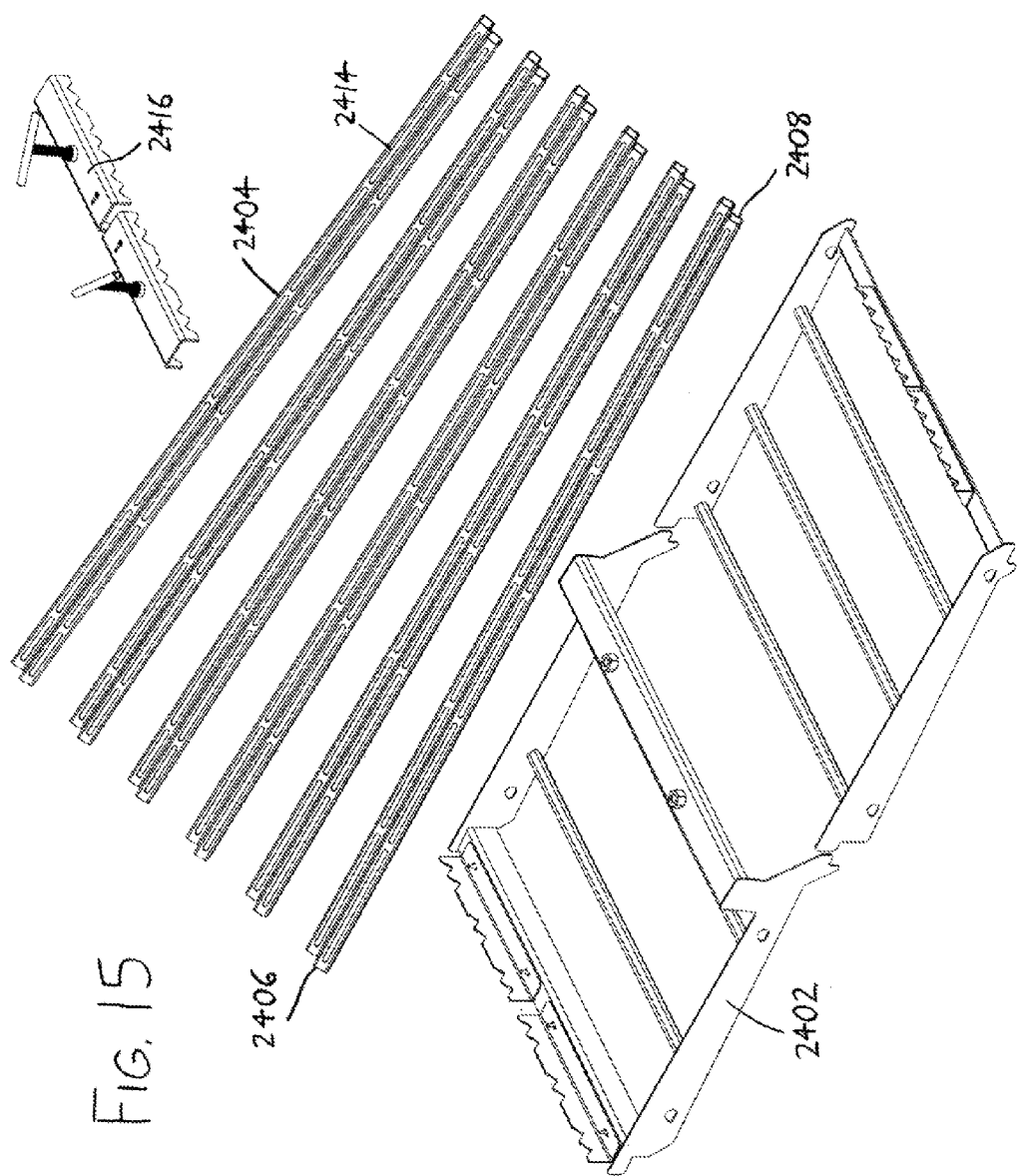
FIG. 15 is a partially exploded perspective view of the path adjustment frame 2400 of FIG. 14, providing more detail regarding the tube-like path adjustment lanes 2402 and their mounting to the path adjustment pan 2402.

FIGS. 14-15 illustrate the path adjustment frame 2400, and its three tiers of path adjustment pans 2402, each including several tube-like path adjustment lanes 2402 held in place by brackets 2416. With adaptation of the brackets 2416, and/or adaptation of the paths defined by the path adjustment lanes 2402 (e.g., by adopting curved path adjustment lanes 2402), one can obtain a desired amount of path modification for the product.

Figure 16:
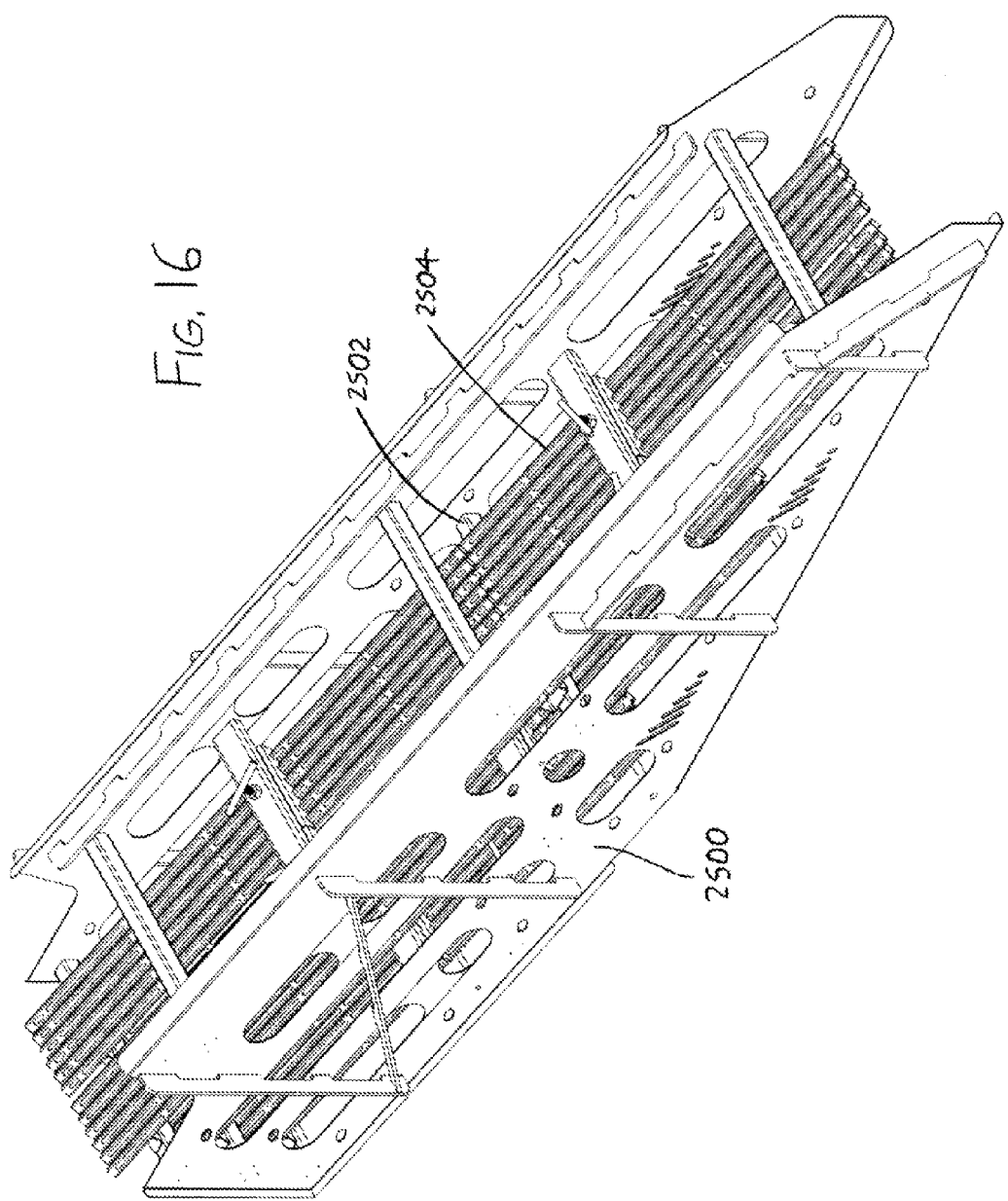
FIG. 16 is a perspective view of the product accumulator frame 2500 of FIGS. 8-9, illustrating the lanes 2504 of its product accumulation pan 2502 in greater detail.
Figure 17:
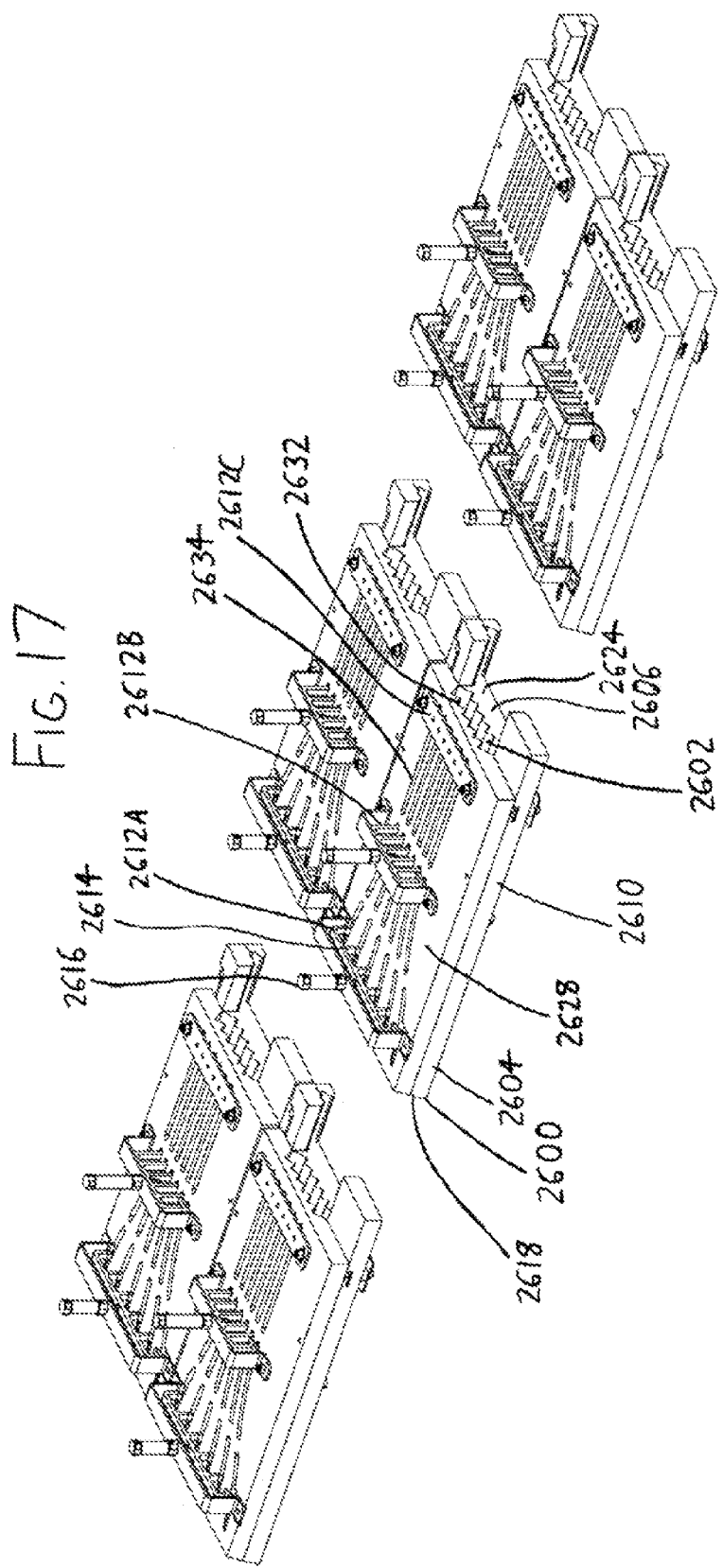
FIG. 17 is a perspective view of the product loaders 2600 of the vibratory conveyor system 2000 of FIGS. 8-9, showing the product loaders 2600 as situated beneath the product accumulator frame 2500 of FIG. 16.

Referring to FIGS. 8-9 and 16, the product accumulator shaker 2500 has a structure very similar to that of the path adjustment shaker 2400, save that the paths provided by its lanes 2504 are parallel, and different tiers of product accumulation beds 2502 have different lengths (because each is to supply a different set of the product loaders shown in FIG. 17).

Figure 18:
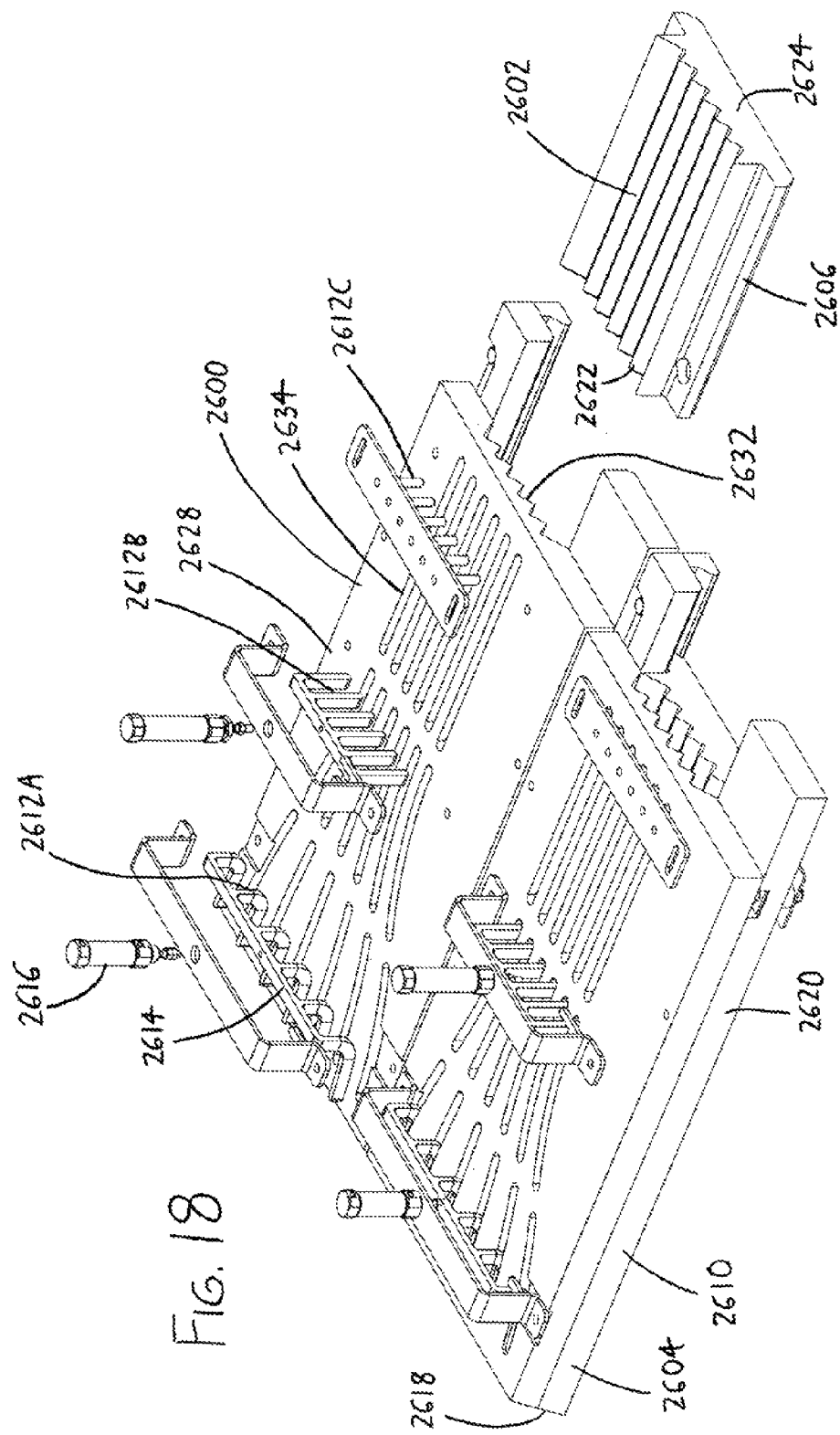
FIG. 18 is a partially exploded perspective view of a pair of the product loaders 2600 of FIG. 17, with the product loader 2600 at right being shown in an exploded state.

FIGS. 18-20 then illustrate the product loader 2600, which uses the downstream pan section 2606 as a slide gate to drop a predetermined amount of product into packaging situated beneath. Preferably, each product loader 2600 in FIG. 17 fills its own package (or its own compartment within a package). Product is received from the product lanes 2504 of the product accumulator frame 2500 (FIG. 16) within "tunnels" (not shown) at the upstream end of the product loader 2600, with the floors of the tunnels being defined by the product loading channels 2602 in the upstream pan section 2604 and downstream pan section 2606 of the product loading pan 2610, and the ceilings being defined by the cover channels 2632 in the product loading pan cover 2628. The downstream pan section 2606 can be actuated by the downstream pan section actuator 2626 to slide further downstream (away from the upstream pan section 2604), with the product loader downstream stops 2612C urging any product resting on the channels 2602 in the downstream pan section 2606 off of the downstream pan section 2606 into any packaging below. As the downstream pan section 2606 opens, the product loader intermediate stops 2612B clamp down upon or obstruct any product on the upstream pan section 2604 to prevent it from feeding forward through the cavity formed by the open upstream pan section 2604. With appropriate timing of the product loader upstream stops 2612A and product loader intermediate stops 2612B, product can be metered onto the downstream pan section 2606 for release into packaging.

The exemplary versions of the invention are shown in the drawings, and described above, to illustrate possible features and forms of the invention. Apart from combining the different features of the foregoing versions in varying ways, other modifications are also considered to be within the scope of the invention.

Typically, when the vibratory conveyor systems 1000 and 2000 are implemented, selected subassemblies of the system (the product distribution frame 1100/2100, the rogue product removal frame 2200, the recycling conveyor 1300/2300, the path adjustment frame 1400/2400, the product accumulator frame 2500, and the product loader 1600/2600) are mounted on overhead tracks, or on underlying rails, allowing the subassemblies to be moved transversely (i.e., perpendicular to the direction of product travel) to allow the subassemblies to be cleaned and maintained.

The particular arrangements of the shaker bases 1120/1422/2120 (FIGS. 1 and 8-9) and vibrating frames/pans shown and discussed in this document are merely exemplary, and other arrangements can be used. In FIG. 1, the product distribution frame 1100 is illustrated as being mounted to an overhead shaker base 1120 via springs 1426, and FIG. 8 shows the product distribution frame 2100 mounted to a lower shaker base 2120 via springs 2124, but these arrangements can be reversed (i.e., overhead bases can be moved beneath the vibrating frames, and vice versa). The shaker base 1120 and shaker motor 1122 might be situated elsewhere about the frame, e.g., as a surrounding structure, or shaker motor or other source of oscillating energy might be directly affixed to a frame.

Figure 2:
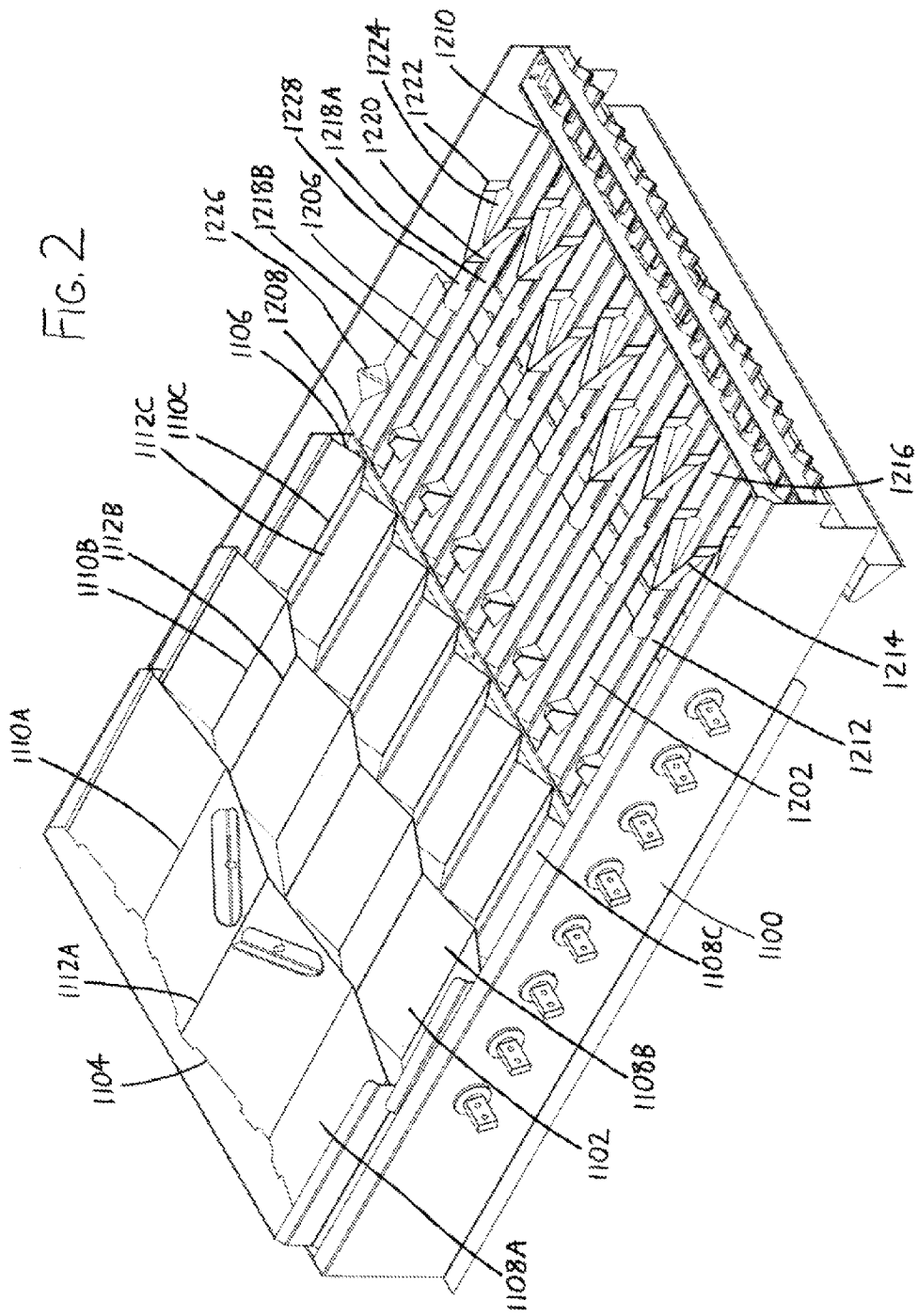
FIG. 2 is a more detailed perspective view of the product distribution frame 1100 of FIG. 1, illustrating the distribution pan 1102 and rogue product removal pan 1202 without the overhanging shaker base 1120 shown in FIG. 1.
Figure 3:
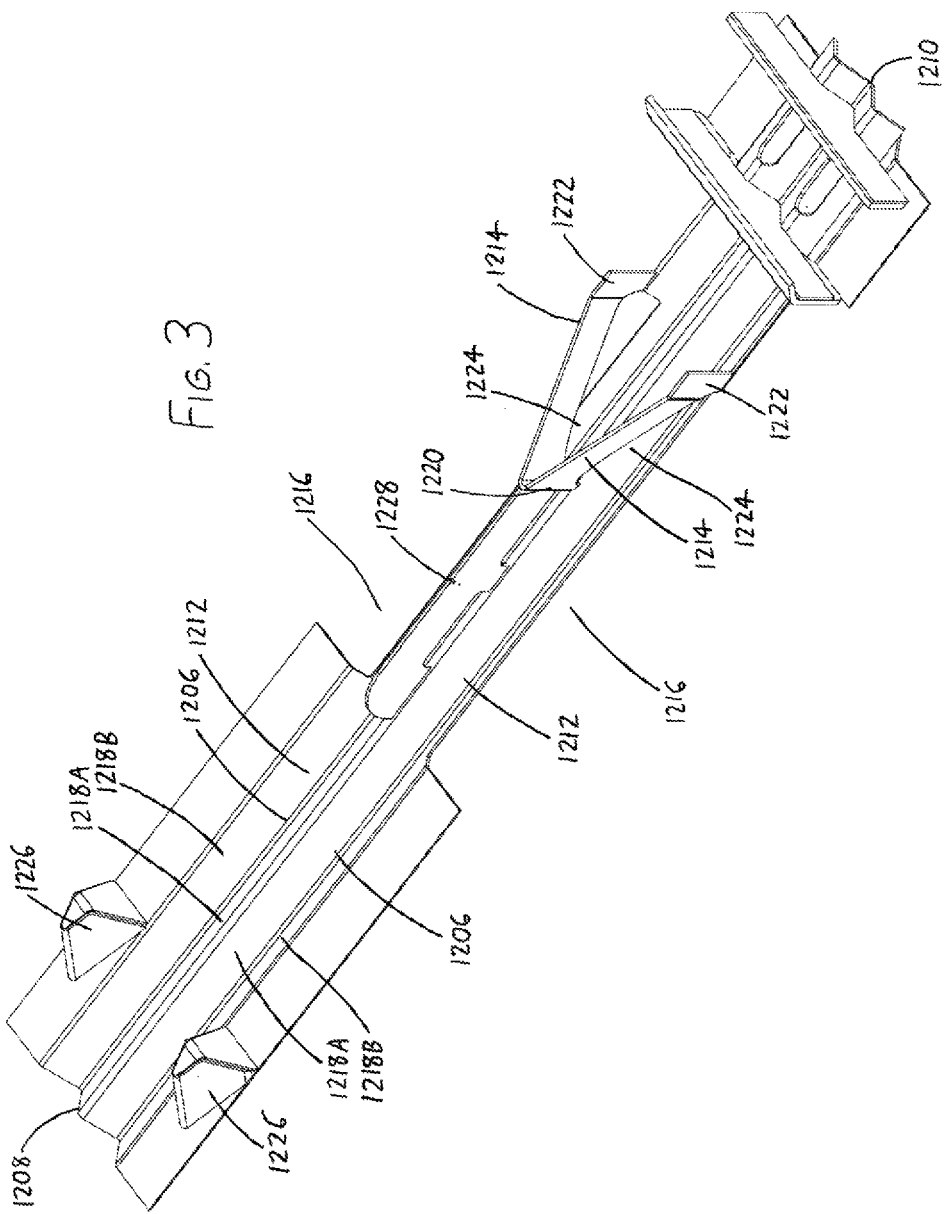
FIG. 3 is a more detailed perspective view of a pair of the product acceptance lanes 1206 of the rogue product removal pan 1202 of FIGS. 1 and 2.
Figure 4:
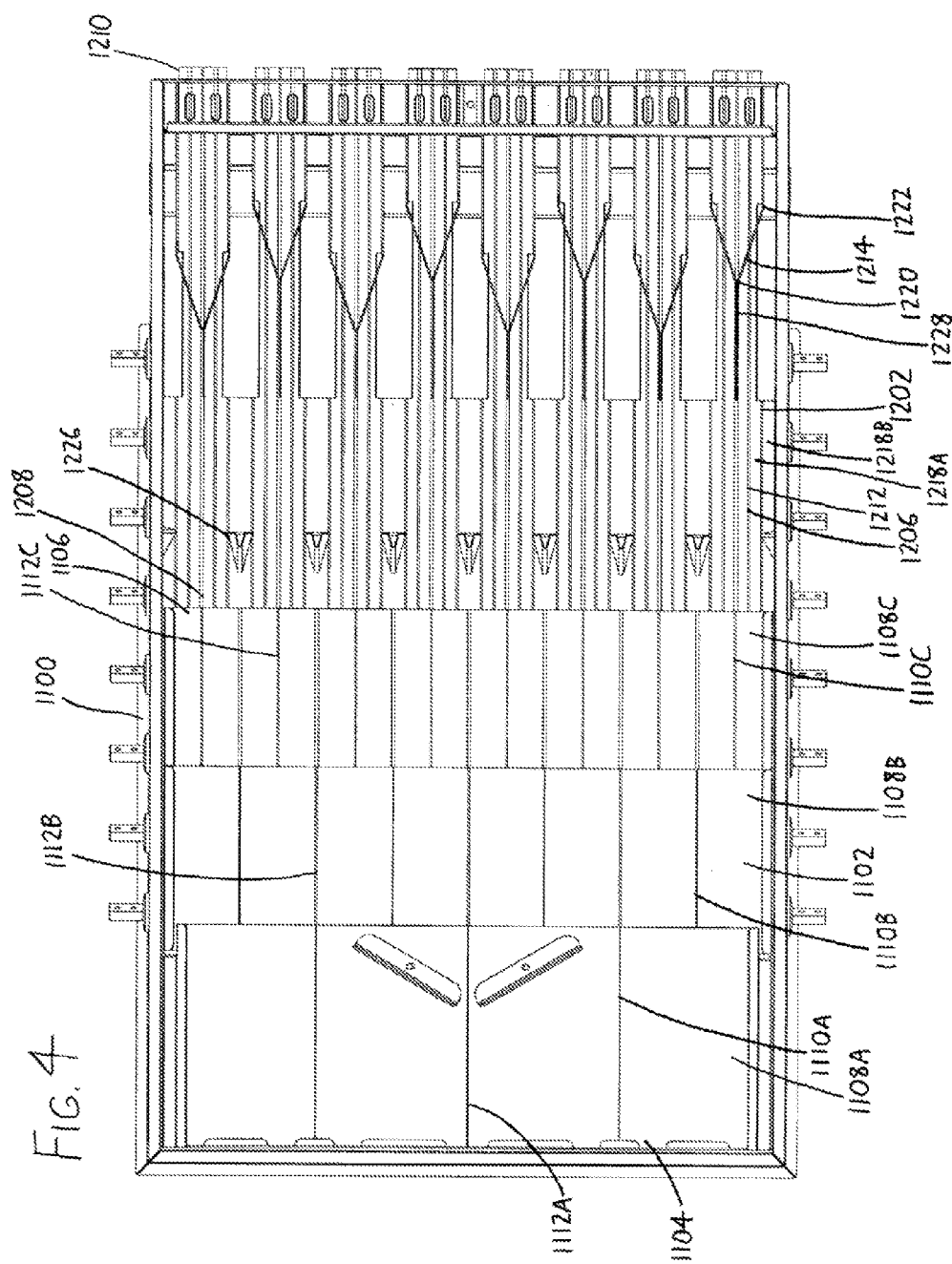
FIG. 4 is a top view of the product distribution frame 1100 of FIGS. 1 and 2, showing the distribution pan 1102 and the rogue product removal pan 1202 from above (and again without the overhanging shaker base 1120 shown in FIG. 1).
Figure 10:
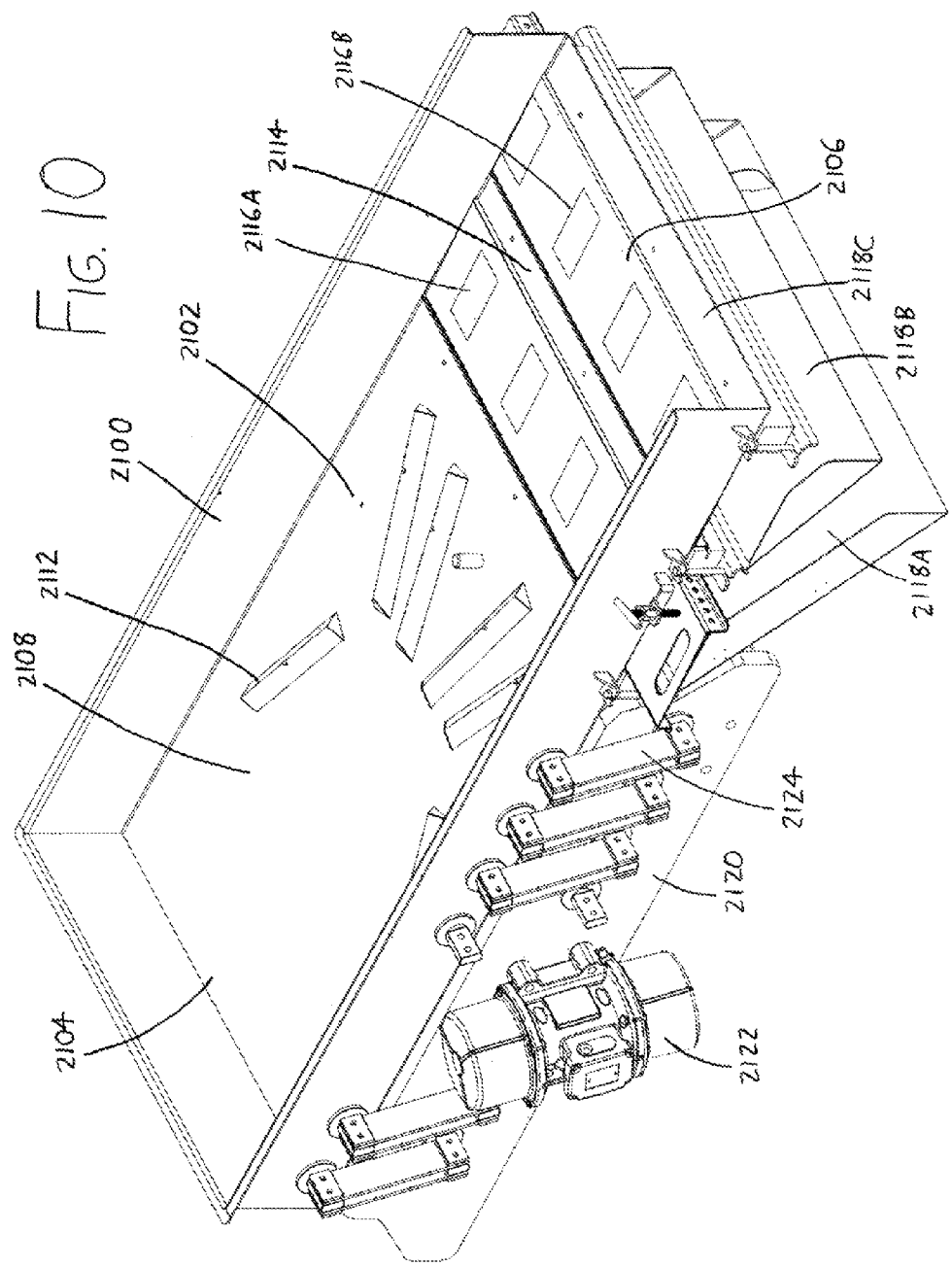
FIG. 10 is a more detailed perspective view of the product distribution frame 2100 of FIGS. 8-9, illustrating the horizontal spreading portion 2108 and vertical spreading portion 2114 of the distribution pan 2102.
Figure 21:
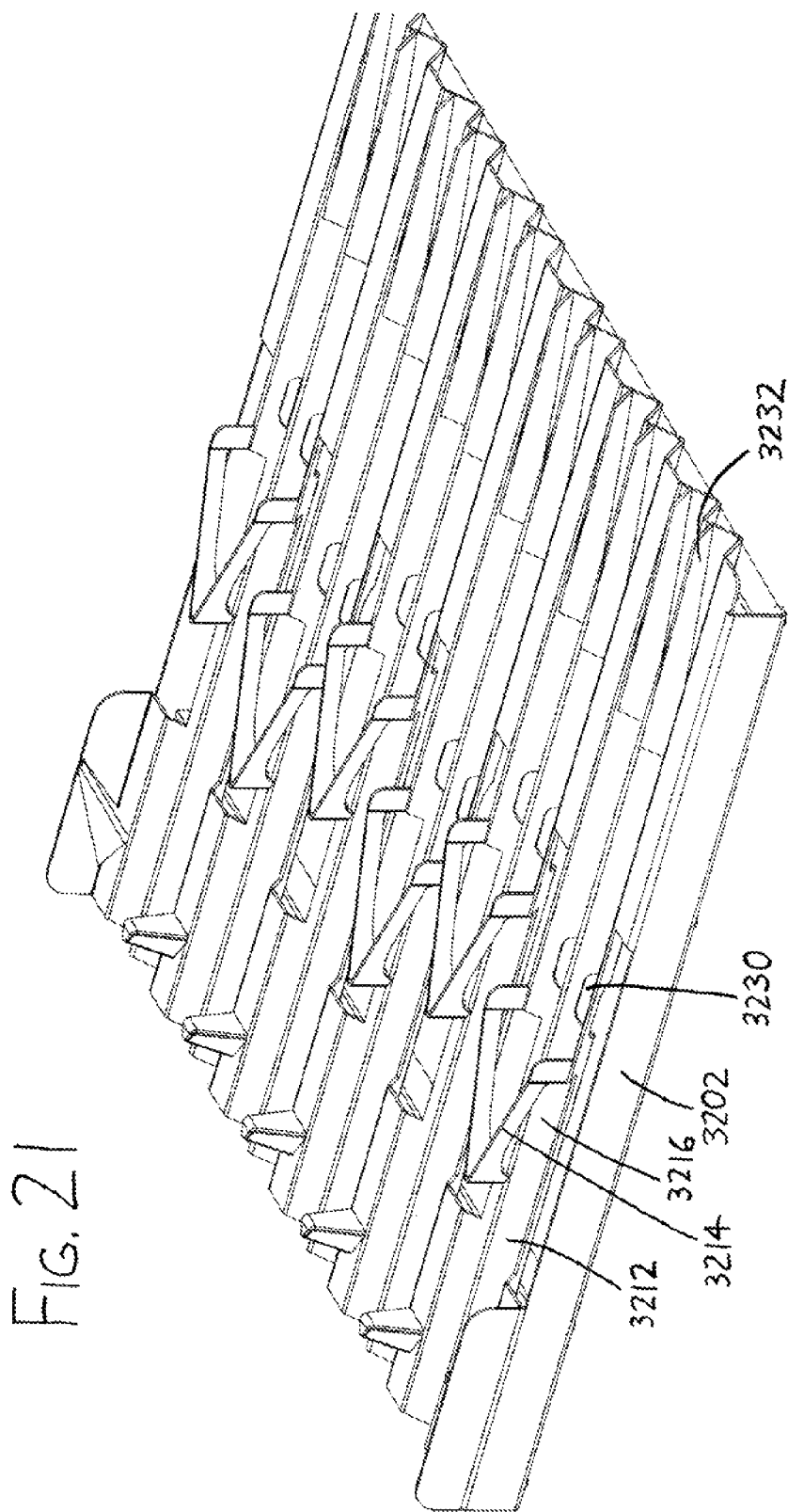
FIG. 21 is a detailed perspective view of an alternative rogue product removal pan 3202 which is particularly useful when the product to be processed is not symmetric about its lengthwise axis, and which may be used in place of the rogue product removal pan 1202 of FIG. 1 and/or in place of the rogue product removal pan 2202 of FIGS. 8-9.

In the product distribution frames 1100 and 2100 of FIGS. 2 and 10, and the rogue product removal frame 2200 of FIG. 11, the various pans—the distribution pans 1102 and 2102 (including the horizontal spreading portion 2108 and vertical spreading portion 2114 of the distribution pan 2102), and the rogue product removal pans 1202 and 2202—are preferably provided as modular components which can be removed and replaced with different components as needed. For example, the distribution pan 1102 of the vibratory conveyor system 1000 might be used in place of the horizontal spreading portion 2108 of the vibratory conveyor system 2000; the distribution pan 1102 might follow the horizontal spreading portion 2108, and precede the vertical spreading portion 2114; the rogue product removal pans 1202 and 2202 might be replaced with a differently-configured rogue product removal pan intended for use with differently-configured product (e.g., the rogue product removal pan 3202 of FIGS. 21-22; the secondary distribution pan 2204 of the rogue product removal frame 2200 of FIG. 10 might be replaced with one resembling the distribution pan 1102 of FIG. 2; and so forth.

In similar respects, the path adjustment frames 1400 and 2400 of FIGS. 5 and 14 are intended to accommodate removable and replaceable modular path adjustment pans 1402 and 2402 having different configurations. Thus, the FIG. 5 path adjustment pan 1402 (and the covers 1412 for the channels 157 defined therein) might be used in the FIG. 14 path adjustment frame 2400 in place of the path adjustment pan 2402 (which is not configured as a conventional "pan," but is more in the nature of a rack upon which the tubular path adjustment lanes 2402 can be mounted via brackets 2416); in FIG. 14, path adjustment lanes 2402 having different cross-sectional areas and/or configurations might be used to accommodate different product, and/or the path adjustment pan 2402 can align these path adjustment lanes 2402 to travel along different paths; and so forth.

While this document has referred to "pans" as being the structure across which product is vibrated, and "frames" as being the surrounding mounting structure for the pans, it should be understood that pans need not be removable from their frames, and can instead be integrally formed with their frames such that the frames and pans constitute a unitary part.

It should be understood that the various subassemblies of the vibratory conveyor systems 1000 and 2000 could be used interchangeably, whether in the form illustrated and described above, or in alternative forms having the features set forth in the claims below. Further, nonessential subassemblies may be removed, additional (and possibly duplicate) subassemblies might be added, and/or the order of the subassemblies might be varied. As an example, either of the recycling conveyors 1300/2300 can be used in place of the other, or could be eliminated entirely, with culled product being collected in containers for later reintroduction upstream. As another example, the path adjustment frames 1400/2400 of FIGS. 6 and 14 (and the product accumulator frame 2500 of FIG. 16) may be eliminated from the vibratory conveyor systems 1000 and 2000 of FIGS. 1 and 8-9, and the product may be supplied directly from the rogue product removal pans 1202/2202 to the product loaders 1600/27600 if the product has ready-for-packaging spacing when it leaves the rogue product removal pans 1202/2202. As yet another example, in FIG. 2, the distribution pan 1102 and rogue product removal pan 1202 could be provided on their own frames rather than on the same frame 1100. It is notable that the distribution pans 1102/2102 are not strictly necessary, but they are helpful where product throughput is greater, and/or where longer product is being processed. If lower product throughput and/or shorter product is involved, it is possible to simply provide product to a rogue product removal pan 1202/2202 such as that in FIGS. 2 and 11, and rely on the culling-and-recycling feature to continually rework product until it is properly aligned. As a final example, either of the product loaders 1600/2600 might be used in place of the other, or a different product loader (or no product loader) might be used. It should also be understood that the various subassemblies and their pans and other components can be provided in a "single-tier" form, as in FIGS. 1-7, or in a "multi-tier" form, as in the three-tier conveyor system of FIGS. 8-20.

It should be understood that when this document states that one subassembly receives product from another—for example, when it is said that the product loader 1600/2600 receives product from the rogue product removal pan 1202/2202—this should be understood as encompassing both the case that the product loader 1600/2600 directly receives product from the rogue product removal pan 1202/2202, with no intervening subassemblies transporting product between the rogue product removal pan 1202/2202 and the product loader 1600/2600, as well as the case of the product loader 1600/2600 indirectly receiving product from the rogue product removal pan 1202/2202 via one or more intervening subassemblies.

The versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:

1. A vibratory conveyor system having a rogue product removal pan including a product acceptance lane extending between a rogue product removal pan upstream end and a rogue product removal pan downstream end, the product acceptance lane including:

a. a product acceptance channel having:

(1) a product acceptance channel length extending between the rogue product removal pan upstream end and the rogue product removal pan downstream end, and (2) a product acceptance channel width oriented perpendicularly to the product acceptance channel length, wherein product may travel along the product acceptance channel toward the rogue product removal pan downstream end as the rogue product removal pan is vibrated;

b. a deflector having a deflector length extending:

(1) above the product acceptance channel, whereby a product passage is defined below the deflector and above the product acceptance channel, and (2) at an obtuse angle with respect to an upstream portion of the product acceptance channel length, wherein product traveling along the product acceptance channel may be dislodged therefrom by the deflector if the product is not aligned to pass through the product passage;

c. a culling aperture in the rogue product removal pan alongside:
  (1) the product acceptance channel, and
  (2) the deflector,
  wherein product dislodged from the product acceptance channel by the deflector may fall through the culling aperture.

2. The vibratory conveyor system of claim 1 wherein the deflector is angled with respect to the product acceptance channel to:
  a. extend increasingly across the product acceptance channel width,
  b. while extending toward the rogue product removal pan downstream end.

3. The vibratory conveyor system of claim 1 wherein the deflector defines a bridge joined to the rogue product removal pan on opposite sides of the product acceptance channel.

4. The vibratory conveyor system of claim 1 wherein the rogue product removal pan further includes a guidewall:
  a. extending alongside, and rising above, the product acceptance channel length, and
  b. from which the deflector extends at an obtuse angle with respect to the guidewall.

5. The vibratory conveyor system of claim 1 wherein the product acceptance channel is defined by:
  a. an inner sidewall, and
  b. an outer sidewall situated between the inner sidewall and the culling aperture,
  with the inner and outer sidewalls joined to define a V-shape.

6. The vibratory conveyor system of claim 1 wherein:
  a. the product acceptance channel is laterally bounded by opposing sidewalls,
  b. one of the sidewalls:
    (1) extends alongside the culling aperture, and
    (2) has lesser height adjacent to the culling aperture.

7. The vibratory conveyor system of claim 1 wherein a product opening is defined in the bottom of the product acceptance channel, the product opening:
  a. having a product opening width extending across at least one half of the product acceptance channel width, and
  b. having a product opening length extending along the product acceptance channel length, the product opening length being at least as great as the product opening width.

8. The vibratory conveyor system of claim 1:
  a. wherein the product acceptance channel is laterally bounded by opposing sidewalls,
  b. further including a reorientation guide surface situated within the product acceptance channel, wherein the reorientation guide surface extends from one of the sidewalls toward the other of the sidewalls.

9. The vibratory conveyor system of claim 1
  a. wherein the rogue product removal pan has at least two of the product acceptance lane;
  b. further including at least one wedge, each wedge being situated:
    (1) between a pair of the product acceptance lanes, and
    (2) between:
      (a) the rogue product removal pan upstream end, and
      (b) the culling aperture of one of the product acceptance lanes.

10. The vibratory conveyor system of claim 1 wherein the rogue product removal pan has:
  a. a rogue product removal pan length extending between the rogue product removal pan upstream end and the rogue product removal pan downstream end,
  b. a rogue product removal pan width oriented perpendicular to the rogue product removal pan length,
  c. pairs of the product acceptance channel arrayed across the rogue product removal pan width, each product acceptance channel having elongated opposing inner and outer sidewalls extending along its product acceptance channel length, wherein the inner sidewalls of the product acceptance channels within each pair are adjacently situated;
  d. several of the culling aperture defined in the rogue product removal pan, the culling apertures being spaced across the rogue product removal pan width between the outer sidewalls of adjacent pairs of product acceptance channels;
  e. several of the deflector, with each deflector extending:
    (1) from an inner location between the inner sidewalls of one of the pairs of product acceptance channels,
    (2) to an outer location:
      (a) adjacent one of the culling apertures, and
      (b) located closer to the rogue product removal pan downstream end than to the inner location.

11. The vibratory conveyor system of claim 1 further including a recycling conveyor configured to transport product from a receiving end to a depositing end, wherein:
  a. the receiving end is situated to receive product from the culling aperture of the rogue product removal pan, and
  b. the depositing end is situated to supply product to the rogue product removal pan upstream end.

12. The vibratory conveyor system of claim 1:
  a. wherein the rogue product removal pan has several of the product acceptance lane, and
  b. further including a path adjustment pan having multiple path adjustment lanes wherein:
    (1) each path adjustment lane extends between a path adjustment pan upstream end and a path adjustment pan downstream end,
    (2) each path adjustment lane is defined by a path adjustment channel having:
      (a) a path adjustment channel length extending between the path adjustment pan upstream end and the path adjustment pan downstream end, and
      (b) a path adjustment channel width oriented perpendicularly to the path adjustment channel length,
    (3) at the path adjustment pan upstream end, each path adjustment lane is aligned with a respective one of the product acceptance lanes at the rogue product removal pan downstream end, whereby each path adjustment lane may receive product from its respective product acceptance lane;
    (4) the path adjustment channels are not parallel to each other.

13. The vibratory conveyor system of claim 12 further including path adjustment channel covers, each path adjustment channel cover:
  a. having a length extending above a respective one of the path adjustment channels along its path adjustment channel length, and
  b. being adjustably respaceable from its respective path adjustment channel.

14. The vibratory conveyor system of claim 13 wherein each path adjustment channel cover has:
   a. a concave surface defined therein, the concave surface defining a roof over the path adjustment channel cover's respective path adjustment channel;
   b. path adjustment product viewing apertures situated along its length, the path adjustment product viewing apertures opening onto the concave surface.

15. The vibratory conveyor system of claim 12 further including a path adjustment product stop actuator:
   a. situated adjacent at least one of the path adjustment lanes,
   b. including one or more path adjustment product stops thereon,
   c. being configured to reversibly move each path adjustment product stop toward a respective one of the path adjustment channels of the path adjustment lanes and thereby obstruct product travel within the respective path adjustment channel.

16. The vibratory conveyor system of claim 1:
   a. wherein the rogue product removal pan has several of the product acceptance lane, and
   b. further including a distribution pan having:
      (1) a distribution pan length extending between a distribution pan upstream end and an opposing distribution pan downstream end,
      (2) a distribution pan width oriented perpendicular to the distribution pan length,
      (3) two or more distribution pan tiers arrayed in succession along the distribution pan length, with:
         (a) each distribution pan tier including a series of valleys adjacently arrayed across the distribution pan width, with each pair of adjacent valleys having a peak therebetween, and
         (b) each successive distribution pan tier including more valleys than its preceding distribution pan tier,
   c. wherein the final distribution pan tier in the array is situated to have each of its valleys supply product to one or more of the product acceptance lanes of the rogue product removal pan.

17. The vibratory conveyor system of claim 16 wherein each successive distribution pan tier has:
   a. twice as many valleys as its preceding distribution pan tier, and
   b. every other peak aligned with a lowermost portion of a respective one of the valleys in its preceding distribution pan tier.

18. The vibratory conveyor system of claim 1:
   a. wherein the rogue product removal pan has several of the product acceptance lane, and
   b. further including a distribution pan having:
      (1) a distribution pan length extending between a distribution pan upstream end and an opposing distribution pan downstream end,
      (2) a distribution pan width oriented perpendicular to the distribution pan length,
      (3) vanes situated across the distribution pan width, each vane having a length extending along the distribution pan length, wherein the spacing between the vanes increases as the vanes approach the distribution pan downstream end;
      (4) distribution apertures:
         (a) spaced across the distribution pan width, and
         (b) situated between the vanes and the distribution pan downstream end,
   c. wherein the distribution pan is situated to supply product from its distribution pan downstream end to the product acceptance lanes of the rogue product removal pan.

19. The vibratory conveyor system of claim 18:
   a. further including a rogue product removal frame having two or more of the rogue product removal pan arrayed in a stack;
   b. one of the rogue product removal pans is situated to receive product from the distribution pan downstream end; and
   c. another of the rogue product removal pans is situated to receive product from the distribution apertures.

20. The vibratory conveyor system of claim 1:
   a. wherein the rogue product removal pan has several of the product acceptance lane, and
   b. further including a product loader having a product loading lane with:
      (1) a product loading lane length extending between:
         (a) a product loader upstream end situated to receive product from two or more of the product acceptance lanes, and
         (b) an opposing product loader downstream end;
      (2) a product loading lane width:
         (a) oriented perpendicular to the product loading lane length, and
         (b) bounded by opposing product loading lane walls;
      (3) an endless belt having a belt upper surface:
         (a) defining a floor of the product loading lane, and
         (b) traveling from the product loader upstream end to the product loader downstream end;
      (4) an upper gate:
         (a) situated closer to the product loader upstream end than to the product loader downstream end, and
         (b) configured to reversibly move toward the product loading lane and thereby obstruct product travel therein;
      (5) a lower gate:
         (a) situated between the upper gate and the product loader downstream end, and
         (b) configured to reversibly move toward the product loading lane and thereby obstruct product travel therein,
   whereby:
      A. the belt may transport product along the product loading lane from the product loader upstream end to the product loader downstream end,
      B. with the upper and lower gates occasionally being moved toward the product loading lane to obstruct product travel from the product loader upstream end to the product loader downstream end.

21. The vibratory conveyor system of claim 1:
   a. wherein the rogue product removal pan has several of the product acceptance lane, and
   b. further including a product loader having:
      (1) a product loading pan with:
         (a) an upstream pan section having an upstream pan section upstream end and an upstream pan section downstream end,
         (b) a downstream pan section having:
            (i) a downstream pan section upstream end adjacent the upstream pan section downstream end, and
            (ii) an opposing downstream pan section downstream end, (c) a downstream pan section actuator configured to move the downstream pan section in a downstream direction with respect to the upstream pan section, (d) multiple product loading channels, each product loading channel:
  (i) extending from the upstream pan section upstream end across the upstream pan section and the downstream pan section to the downstream pan section downstream end,
  (ii) being situated to receive product at or adjacent the upstream pan section upstream end from a respective one of the product acceptance lanes, (2) multiple product loader upstream stops configured to reversibly move toward the product loading channels at or near the upstream pan section downstream end, and thereby obstruct product travel in the product loading channels, (3) multiple product loader downstream stops in fixed spaced relationship from the upstream pan section, the product loader downstream stops:
  (i) obstructing the product loading channels near the downstream pan section downstream end when the downstream pan section is not actuated to move in a downstream direction with respect to the upstream pan section, and
  (ii) obstructing the product loading channels near the downstream pan section upstream end when the downstream pan section is actuated to move in a downstream direction with respect to the upstream pan section, whereby:
A. the upstream pan section may accumulate product in its product loading channels received from the product acceptance lanes when the product loader upstream stops obstruct product travel,
B. the downstream pan section may receive product from the upstream pan section when the product loader upstream stops do not obstruct product travel, and
C. the downstream pan section, after receiving product from the upstream pan section, may be actuated to move in a downstream direction with respect to the upstream pan section, with the product loader downstream stops urging product within the downstream pan section's product loading channels out of the downstream pan section upstream end.

22. The vibratory conveyor system of claim 21 wherein the product loader further includes a product loading pan cover:

a. situated above the product loading pan,
b. having:
  (1) a product loading pan cover lower surface having product loading pan cover channels defined therein, the product loading pan cover channels each being situated above:
    (a) a respective one of the product loading channels of the upstream pan section, and
    (b) a respective one of the product loading channels of the downstream pan section,
  (2) a product loading pan cover upper surface having loader product viewing apertures defined therein, the loader product viewing apertures opening onto the product loading channels.

23. The vibratory conveyor system of claim 21:
a. further including a rogue product removal frame having two or more of the rogue product removal pan arrayed in a stack, each rogue product removal pan having several of the product acceptance lane;
b. two or more product loaders arrayed in a line, each product loader being situated to receive product:
  (1) at or adjacent its upstream pan section upstream end,
  (2) from the product acceptance lanes of a respective one of the rogue product removal pans.

24. A vibratory conveyor system having a rogue product removal pan including:
a. a rogue product removal pan length extending between a rogue product removal pan upstream end and an opposing rogue product removal pan downstream end,
b. a rogue product removal pan width oriented perpendicular to the rogue product removal pan length,
c. pairs of product acceptance channels arrayed across the rogue product removal pan width, each product acceptance channel having elongated opposing inner and outer sidewalls extending along the rogue product removal pan length, wherein the inner sidewalls of the product acceptance channels within each pair are adjacently situated;
d. culling apertures defined in the rogue product removal pan, the culling apertures being spaced across the rogue product removal pan width between the outer sidewalls of adjacent pairs of product acceptance channels;
e. deflectors, with each deflector extending:
  (1) from an inner location above the inner sidewall of one of the product acceptance channels,
  (2) to an outer location:
    (a) above the outer sidewall of the same product acceptance channel, and
    (b) located closer to the rogue product removal pan downstream end than the inner location.

* * * * *